Jan. 15, 1952  R. V. POUND  2,582,604
APPARATUS FOR BROAD-BAND RADIO TRANSMISSION
Original Filed Feb. 8, 1943  5 Sheets-Sheet 1

INVENTOR
ROBERT V. POUND

BY  ATTORNEY

Jan. 15, 1952   R. V. POUND   2,582,604
APPARATUS FOR BROAD-BAND RADIO TRANSMISSION
Original Filed Feb. 8, 1943   5 Sheets-Sheet 2

INVENTOR
ROBERT V. POUND

BY

ATTORNEY

Jan. 15, 1952     R. V. POUND     2,582,604

APPARATUS FOR BROAD-BAND RADIO TRANSMISSION

Original Filed Feb. 8, 1943     5 Sheets-Sheet 4

INVENTOR
ROBERT V. POUND

BY     *M. Q. Hayes*

ATTORNEY

INVENTOR
ROBERT V. POUND

Patented Jan. 15, 1952

2,582,604

UNITED STATES PATENT OFFICE 2,582,604

APPARATUS FOR BROAD-BAND RADIO TRANSMISSION

Robert V. Pound, Cambridge, Mass., assignor, by mesne assignments, to the United States of America as represented by the Secretary of the Navy Original application February 8, 1943, Serial No. 475,149. Divided and this application August 10, 1948, Serial No. 43,526

13 Claims. (Cl. 178—44)

This invention relates to linear transmission devices for transferring high-frequency oscillatory electric energy, and is a division of my copending application, Serial No. 475,149, filed February 8, 1943, now Patent No. 2,446,982, August 10, 1948, and entitled "Apparatus for Broad Band Radio Transmission."

In particular this invention relates to stub-supported two-conductor lines adapted to transfer energy at a range of frequencies without the occurrence of reflections or standing waves above a predetermined small amplitude. Since the two-conductor transmission lines generally used with stub supports are almost invariably of the coaxial conductor type the invention in its most practical aspects relates to coaxial conductor transmission lines chiefly.

High-frequency transmission lines supported by short-circuited quarter-wave stub lines are for many reasons preferred over insulator-spaced transmission lines. A transitory flashover in an insulator-supported line is likely to cause permanent damage to the insulators, thereby enhancing the probability of further breakdown, whereas in a stub-supported line, a transitory flashover will usually leave the line in as good condition as before. The use of stub-supported lines has heretofore been complicated by the fact that the stub support is usually completely effective only for a given frequency and that reflections are set up at other frequencies which are quite considerable even with a small difference between the frequency of operation and the design frequency. Frequency-sensitivity arising from the association of a resonant element or structure with some kind of transmission means is also a problem in apparatus other than stub-supported coaxial conductor lines.

It is an object of this invention to provide means for counteracting the frequency-sensitivity of resonant elements associated with transmission lines and the like and for producing thereby a combined structure which will permit the transmission of electrical oscillatory energy over a relatively wide range of frequencies. It is a particular object of this invention to provide stub supports for a transmission line which will permit the transmission of a range or band of frequencies with little or no reflections and which may readily be provided in a form suitable for the construction of coaxial conductor transmission lines. It is a further special object of this invention to provide a stub support of such form that transmission of a range of frequencies with little or no reflections and little or no attenuation may be effected even though only a single stub support or an odd number of stub supports are used in the transmission line in question. Other objects of this invention will be apparent from the following description of the invention.

The effect of quarter-wave stub supports upon the frequency transmission characteristic of a two-conductor transmission line with which said stub supports are associated may be referred to as frequency-sensitivity. If at the design frequency the supporting stubs have zero susceptance, then, at lower frequencies, for which the stubs will be less than a quarter-wave long, these stubs will have an inductive susceptance and will set up the corresponding type of energy reflection where they connect with the transmission line. Likewise, at higher frequencies, for which the stubs are more than a quarter wave long, these stubs will have a capacitive susceptance and will set up a corresponding type of reflection where they connect with the transmission line. In the principal form of the present invention, in order essentially to neutralize the aforesaid frequency-sensitivity over a range of frequencies in the neighborhood of the design frequency, there are associated with each stub two "transformers," one on each side of the stub, which transformers may, and preferably do, form a single structure with its center at the location of the stub. These transformers are sections of transmission line of a length substantially equal to an odd number of quarter-wave lengths, preferably a single quarter-wave length, and having a characteristic admittance different from that of the rest of the transmission line. In the preferred case, where the two transformers unite to form a single structure, as well as in certain other cases, the characteristic admittance of the section of line which constitutes the transformer is greater than that of the main portions of the transmission line. Such transformers may be readily constructed by varying the relative diameters of the conductor of a coaxial conductor transmission line for the desired length of line. This is most conveniently done by enlarging or reducing the diameter, as the case may be, of the inner conductor of such a transmission line.

The invention will be more fully explained with reference to the annexed drawings, in which.

Figure 10:
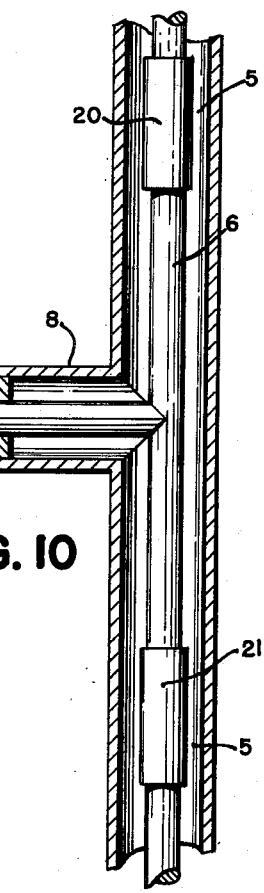
Figure 12:
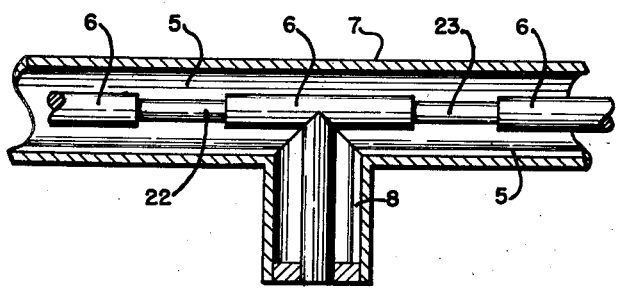
Figure 13:
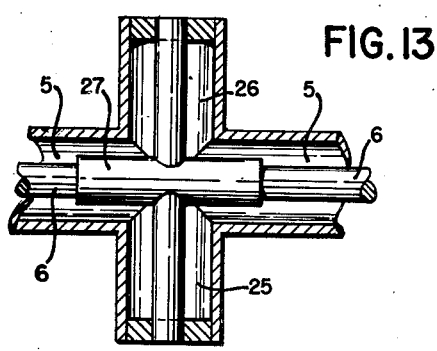
Figure 16:
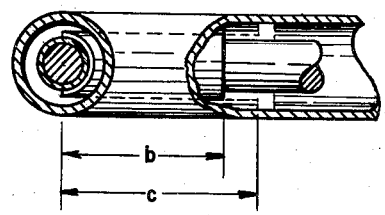
Figure 14:
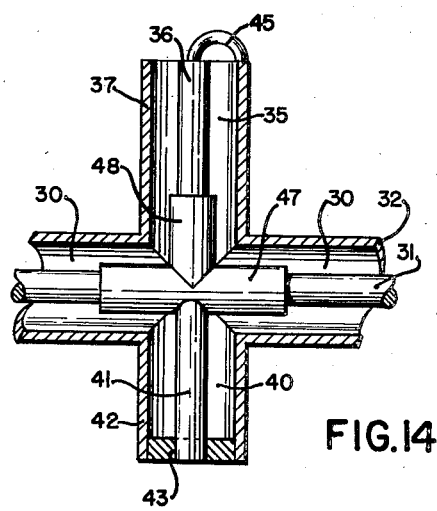
Figure 15:
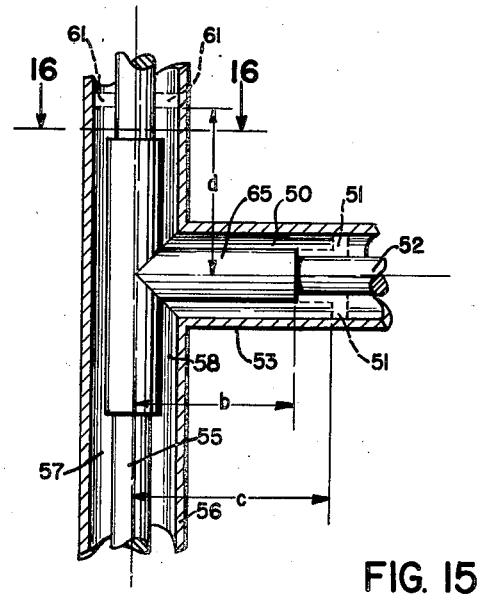
Figure 17:
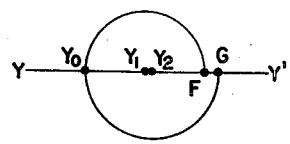
Figure 18:
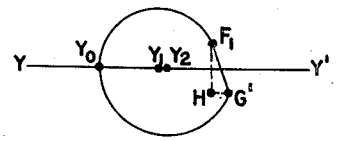
Figure 19:
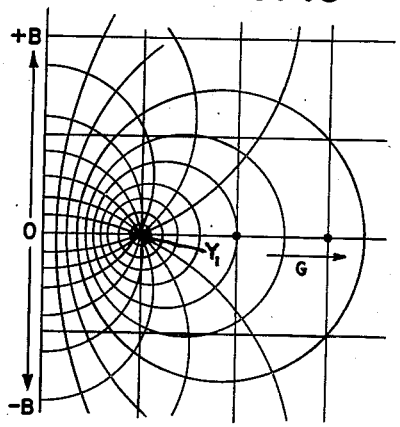
Figure 20:
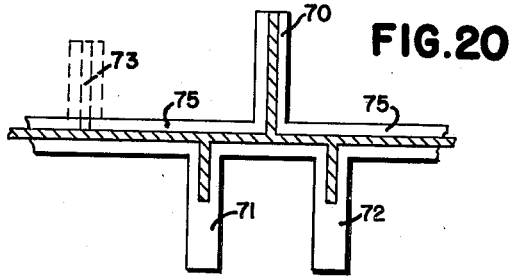
Figure 21:
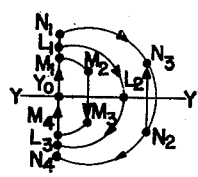
Figure 22:
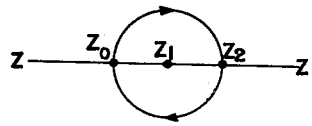
Figure 22:
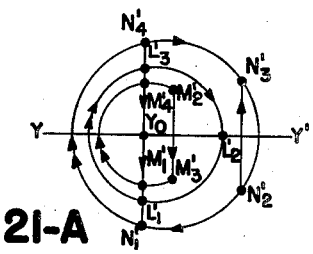
Figure 22:
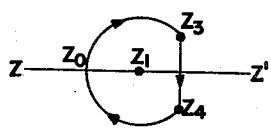
Figure 23:
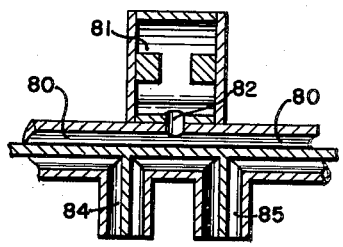
Figure 23:
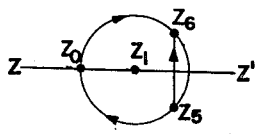
Figure 24:
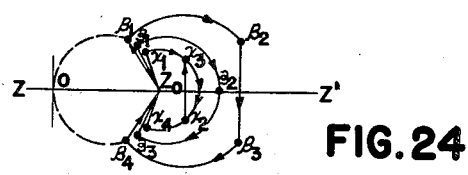
Figure 25:
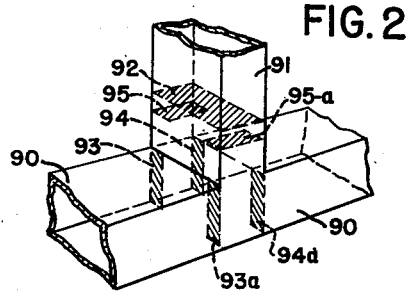
Figure 26:
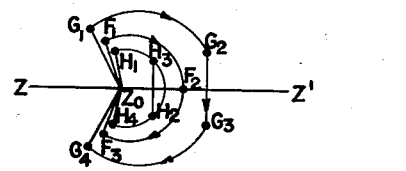
Figure 27:
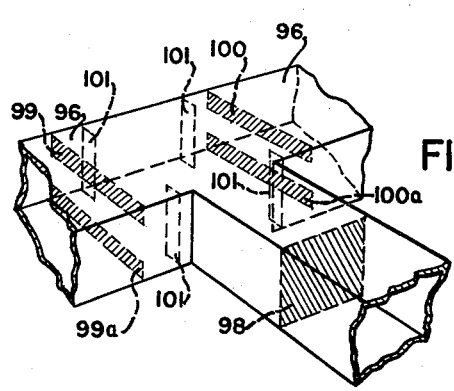
Figure 28:
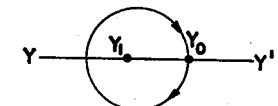
Figure 28:
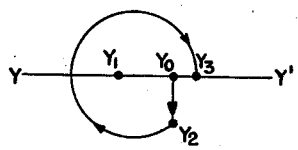
Figure 28:
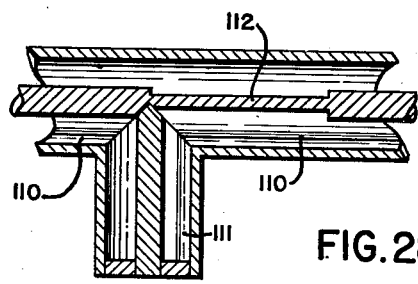
Figure 29:
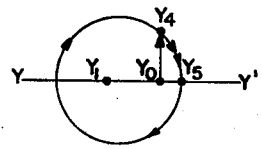
Figure 29:
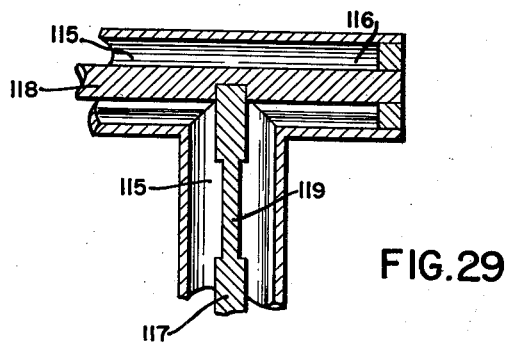
Figure 30:
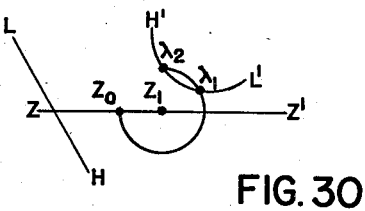

Figs. 4, 5, 6, 7, 8, 9, and 11 are theoretical diagrams for the purpose of explaining the behavior of stub supports constructed in accordance with the present invention;

Fig. 10 is a longitudinal view, chiefly in section, showing another form of supporting stub and its associated transformers in accordance with the present invention;

Fig. 12 is a longitudinal view of still another form of supporting stub and associated transformer in accordance with the present invention;

Fig. 13 shows a form of double stub support as constructed in accordance with the present invention;

Fig. 14 illustrates the application of the present invention to a T-junction connecting a transmission line to a side branch which is adapted to be short circuited during transmission at high power levels along the said transmission line;

Fig. 15 is a longitudinal view, partly in section, of a form of stub support for a coaxial conductor transmission line which is adapted to be used either as a "straight through" or as a "right angle" support;

Fig. 16 is a partly sectional view of the apparatus shown in Fig. 15 along the line 16—16 of Fig. 15;

Figs. 17 and 18 are theoretical diagrams illustrating the behavior of the form of the invention shown in Figs. 15 and 16;

Fig. 19 is a theoretical diagram illustrating relations simplified in certain other diagrams;

Fig. 20 is a sectional view of another form of apparatus embodying the present invention and Figs. 21 and 21A are theoretical diagrams relating thereto;

Fig. 22 is a sectional view of still another form of apparatus embodying the present invention and Figs. 22A, 22B and 22C are theoretical diagrams relating thereto;

Fig. 23 is a sectional view of still another form of apparatus embodying the present invention and Fig. 24 is a theoretical diagram relating thereto;

Fig. 25 is a diagrammatic perspective view of a form of apparatus embodying the present invention and employing hollow pipe wave guides, and Fig. 26 is a theoretical diagram relating thereto;

Fig. 27 is a diagrammatic perspective view of another form of apparatus embodying the present invention and also comprising hollow pipe wave guides;

Figs. 28 and 29 illustrate, in cross section, forms of apparatus realizing a partial accomplishment of the purposes of the invention;

Figs. 28A, 28B and 28C are theoretical diagrams relating to the apparatus of Fig. 28 and Fig. 30 is a theoretical diagram relating to the apparatus of Fig. 29.

Figure 1:
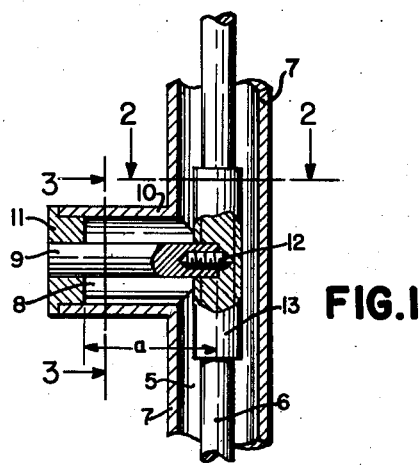
Fig. 1 is a longitudinal view, mostly in section, of one form of supporting stub for a coaxial conductor transmission line in accordance with the present invention.
Figure 3:
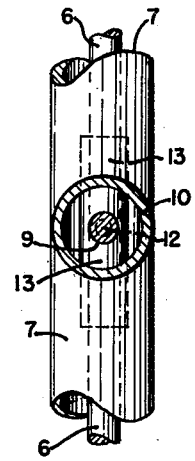
Fig. 3 is a sectional view of the structure of Fig. 1 along the line 3—3 of Fig. 1.
Figure 2:
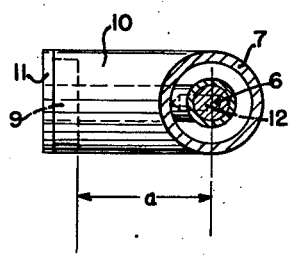
Fig. 2 is a sectional view of the structures of Fig. 1 along the line 2—2 of Fig. 1.

In Figs. 1, 2, and 3 is shown a coaxial conductor transmission line 5 having an inner conductor 6 and an outer conductor 7, the ends of the transmission lines being broken away in Figs. 1 and 3 for convenience of illustration. A stub support consisting of the section of transmission line 8 having an inner conductor 9 and an outer conductor 10 connected by a short-circuiting plug 11 serves to maintain the conductor 6 in fixed relation to the conductor 7. The conductors 6 and 9 are drilled and tapped to receive a threaded stud 12, which may be of steel or brass, for the purpose of permitting convenient assembly of the stub. Since very little current flows in and out of the stub where it connects with the transmission line, a soldered joint is not necessary at this point. Good electrical contact is, however, desirable between the plug 11 and the conductors 9 and 10, so that the plug 11 is preferably soldered to the said conductors.

In the neighborhood of the stub line 8, the diameter of the conductor 6 is enlarged for a total length of approximately a half-wave length for the frequencies desired to be transmitted. This enlargement of the diameter of the conductor 6, which constitutes a pair of quarter-wave transformers on each side of the center of the stub between the stub and the transmission line 5, may be conveniently provided by a close fitting sleeve 13 mounted on the conductor 6 and preferably soldered thereto at least at its ends.

The function of the arrangement shown in Figs. 1, 2, and 3 and the manner in which the important dimensions are related will be understood from a consideration of the theoretical diagrams of Figs. 4–9, inclusive. Referring to these figures, the line YY' represents the real axis of an admittance diagram, the point $Y_0$ indicates the characteristic admittance of the transmission line 5 and the point $Y_1$ indicates the characteristic admittance of the transmission line constituted by the transformer, which is to say of the transmission line composed of the conductor 13 as inner conductor and the conductor 7 as outer conductor (Fig. 1). It is desired, in order that transmission may be achieved along the line 5 past the stub 8 without substantial reflections, that when the line 5 is properly terminated and, therefore, presents the admittance $Y_0$ when looking away from the stub from beyond the matching transformer, it should also present the same admittance $Y_0$ when seen through the matching transformer and stub.

Let it be assumed that at the point 15 on Fig. 1 the portion of the line 5 extending downward therefrom presents an admittance of $Y_0$. Since the characteristic admittance of the transformer is $Y_1$, the admittance at various points farther and farther up from the location 15, which is the lower end of the transformer, will be represented by an arc of a circle drawn about $Y_1$ beginning at $Y_0$ and proceeding in the clockwise direction as shown on Fig. 4. Let it be assumed that the transformer is a half-wave length long and is symmetrically disposed about the axis of the stub. The admittance presented at various points along the first quarter-wave length of the stub to the first quarter-wave length of the transformer which is to say between the location 15 and the axis of the stub 8 will then be represented by an arc 180° long, so that the admittance at the axis of the stub, disregarding for the moment the effect of the stub, will be represented by the point A on Fig. 4, which, since it lies on the real axis, has no imaginary (susceptance) components. Let it now be assumed that the stub has an electrical length of a quarter-wave length for the frequency in question. At such a frequency, therefore, the stub will have a zero susceptance, and if conductive losses are neglected, which may be done for practical purposes, it will present likewise zero conductance, so that the effect of the stub upon the admittance at the center of the transformer is zero for the frequency now under consideration. The admittance at points along the transformer between the axis of the stub and the upper end of the transformer may then be represented by another semi-circle beginning at the point A with its center $Y_1$, so that the admittance looking down at the upper end of the transformer of Fig. 1 is seen to be the desired value of $Y_0$ for the conditions just described.

At frequencies lower than that for which the transformer has a total length of one-half-wave length, the arc showing the change in admittance between the location 15 at the bottom end of the transformer and the axis of the stub will be less than 180° long, and likewise, at frequencies lower than that at which the stub has an electrical length of a quarter-wave length, the stub will provide an inductive susceptance across the line (more exactly speaking, across the transformer). There will generally be some frequency lower than that for which the conditions of Fig. 4 obtain at which the two effects just mentioned will exactly counteract each other, as shown in Fig. 5. In Fig. 5 it is seen that at some frequency the admittance at the axis of the stub when measured in the absence of the stub will be represented by a point B. The effect of the stub, which is that of adding an inductive susceptance, may then be represented by a downwardly directed vertical line B—C. When the effect of the other half of the transformer is added in by the circular arc beginning at C, it is seen that the admittance presented at the top of the transformer is again $Y_0$.

Figure 4:
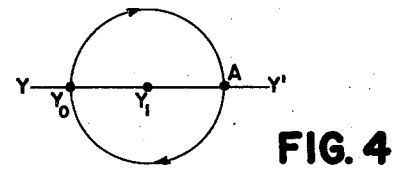
Figure 5:
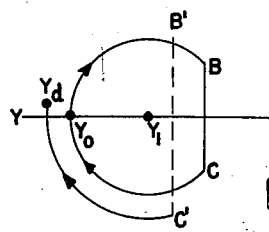

The effect of the transformer and the admittance of the stub do not change in the same manner with respect to frequency, although the manner in which these effects change with frequency, in the range between the frequency for which the conditions of Fig. 4 obtain and the frequency for which the conditions just illustrated with respect to Fig. 5 obtain differ only slightly. For intermediate frequencies in this range, the admittance looking down the line 5 through the transformer and stub will not be appreciably different from $Y_0$ (this has been confirmed by experiments). For some frequency substantially lower than that corresponding to the diagram $Y_0BC$ of Fig. 5, however, a different situation will generally prevail, as shown on Fig. 5 with the assistance of the dotted line B'C'. The effect of the first half of the transformer will then be represented by the arc $Y_0B'$, the effect of the stub will be represented by the vertical line B'C' and the effect of the second half of the transformer will be represented by the arc $C'Y_a$, $Y_a$ being the admittance looking down the line through the transformer and past the stub. $Y_a$ being appreciably different from $Y_0$, reflections will occur when it is sought to transmit energy at the frequency in question in the line 5.

Figure 6:
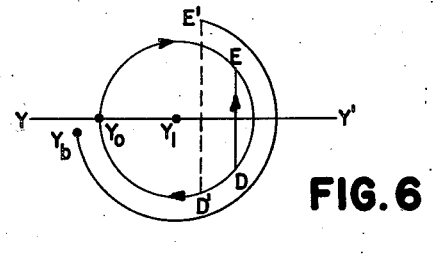

In general, the effects of the stub and of the transformer arrangements will exactly counteract each other at a frequency higher than that for which the conditions of Fig. 4 obtain as well as at a frequency lower than the said frequency. The higher frequency case is illustrated in Fig. 6. In this case the effect of the first half of the transformer will be represented by the arc $Y_0D$, which is more than 180° in length. The frequency being higher than that for which the stub is an electrical quarter-wave length long, the stub will present a capacitive susceptance, which is indicated on Fig. 6 by the upwardly directed vertical line DE. The effect of the second half of the transformer will then be shown by the arc $EY_0$, which like the arc $Y_0D$ is more than 180°, both these arcs being of the same length in degrees on account of the symmetrical arrangement of the transformer. For some frequency considerably higher than that just considered the effect of the first half of the transformer will be represented by the arc $Y_0D'$, the effect of the stub by the vertical line D'E', and the effect of the second half of the transformer by the arc $E'Y_b$. $Y_b$ being appreciably different from $Y_0$, reflections will occur at this frequency, while for the frequency for which the diagram $Y_0DEY_0$ applied, the input admittance of the system was exactly $Y_0$, so that at that frequency no reflections would occur.

The three frequencies represented respectively by the situation shown in Fig. 4, the situation shown by the diagram $Y_0BCY_0$ of Fig. 5 and the situation shown by the diagram $Y_0DEY_0$ of Fig. 6 (which frequencies may be spoken of as the resonant frequencies of the system, the system being in a sense a band-pass filter) may be made to be closer together or farther apart by controlling the amount by which the conductor 6 is enlarged by the sleeve 13 and by controlling the relative diameter of the conductors 9 and 10 which determine the characteristic admittance of the stub 8. Increasing the thickness of the sleeve 13 will increase the radius $Y_1Y_0$ of the circle shown in Figs. 4, 5, and 6, thereby increasing the effect of the transformer for a given change in frequency. The range within which the distance of the points B, D, etc., from the axis YY' varies linearly with frequency with be extended to larger values of susceptance, which will tend to increase the band-width, particularly if the effect of the stub is approximately linear within such range.

Decreasing the characteristic admittance of the stub 8 will tend to increase the separation between the resonant frequencies as above defined, but at the same time, if carried too far, this may result in increasing the amount of reflections for frequencies lying between these resonant frequencies. Since in the form of apparatus herein described no measurable reflections have been detected within the pass bands of the respective devices, it follows that the characteristic admittance may be considerably reduced without introducing an undesirable amount of reflections. In practice it is convenient to make the characteristic admittance of the stub line 8 the same as the characteristic admittance of the line 5 for the convenience of construction that results from using tubing and rods of the same diameter as are used for the main part of the transmission line. The effect of the variation of the characteristic admittance of the stub 8 may be understood by considering the fact that the susceptance of the stub 8 as it appears across the line 5 varies with frequency as a trigonometric tangent function in which the characteristic admittance appears as a multiplying factor. The susceptance component of the admittance represented by points such as the point B and the point D in Figs. 5 and 6 respectively, as the frequency is changed, varies as a function which is substantially linear in the neighborhood of the frequency for which the transformer is a half-wave length long and which has a curvature opposite to that of the tangent function as the frequency is either raised or lowered. For certain values of the characteristic admittance of the stub 8, the slopes of the tangent function and of the function corresponding to the susceptance necessary to neutralize the effect of the transformer at various frequencies will be almost the same and the three resonant frequencies will lie close together or even coincide. For smaller values of the characteristic admittance of the stub 8 the curves will cross at larger angles at the middle resonant frequency and the resonant frequencies will lie farther apart.

In the actual practice of the invention, an additional small but appreciable effect is to be observed which should be taken into account in order to obtain the best results possible in accordance with the present invention. This effect requires a small modification of the foregoing description of the operation of the stub support.

Figure 7:
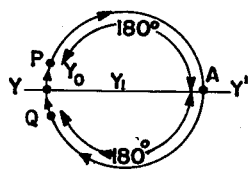

The discontinuity caused by the sudden change of the diameter of the inner conductor 6 at the ends of the transformer appears to add a small capacitive susceptance at each end of the transformer. This effect may be compensated for by either lengthening the stub line 8 or shortening the transformer. In other words, the length of the stub line is to be lengthened relative to the length of the transformer. The frequency for which the transformer is a half-wave length long and the frequency for which the stub is a quarter-wave length long then no longer coincide. Under these conditions the middle resonant frequency of the structure may be made to coincide with the frequency for which the stub is electrically a quarter-wave length long, or it may be made the frequency for which the transformer is a half-wave length long or it may be made some other frequency, such as a frequency between the aforesaid frequencies. The first of these cases corresponds to Fig. 7, the second corresponds to Fig. 8 and the third corresponds to Fig. 9. In these three figures the capacitive effect of the discontinuity at one end of the transformer is shown by the vertical line $Y_0P$ and the capacitive of the discontinuity at the other end of the transformer is shown by the vertical line $QY_0$. Referring to Fig. 7, which illustrates the case where the middle resonant frequency is that for which the stub is electrically a quarter-wave length long, the effect of the first half of the transformer, which for the frequency in question is less than a quarter-wave length, is represented by the arc PA. The stub adds nothing at this frequency and its effect, therefore, does not appear on the diagram. The effect of the other half of the transformer is shown by the arc AQ, which is of the same length and radius as the arc PA. Addition of the susceptance $QY_0$ then shows that the impedance looking down the line through the transformer and past the stub is $Y_0$, as desired.

Figure 8:
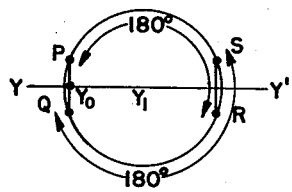

In the situation illustrated Fig. 8, the stub at the middle resonant frequency has the capacitive susceptance RS which is equal to the sum of the susceptances $Y_0P$ and $QY_0$. The arcs PR and SQ, which correspond to the respective effect of the two halves of the transformer, will then be 180° long, thus indicating that at this frequency the total transformer length is a half-wave length.

Figure 9:
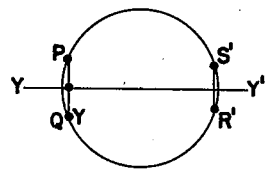
Figure 11:
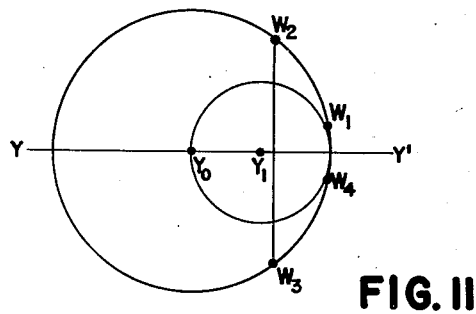

In the situation shown in Fig. 9, the effect of the first half of the transformer is shown by the arc PR', which is less than 180°, and the effect of the stub is shown by the vertical line R'S', which is somewhat shorter than the line QP. The effect of the second half of the transformer is represented by the arc S'Q. This diagram, therefore, represents the case in which the resonant frequency in question is at a frequency between the frequency for which the stub is electrically a quarter-wave length and the frequency for which the transformer is a half-wave length.

In practice the relation between the physical length of the stub line and its electrical length as observed from its electrical behavior is not usually amenable to convenient exact theoretical prediction, at least in the case where the diameter of the line is an appreciable fraction of the wave length, such as ⅛ wave length or more. The non-uniformity in the configuration of the stub-line where it joins the main transmission line requires an estimation of the so-called "end effect" in order to predict the relation of the length of the stub line, as measured from a given point of the junction, to the electrical length of the line. For example, in a coaxial conductor line of a characteristic impedance of 48 ohms in which the inner diameter of the outer conductor is approximately 0.22 wave length, the physical length, measured from the axis of the main line to the terminating conducting surface of the stub, of a stub having an electrical length of a quarter-wave length, is equal to approximately 0.35 times the normal wave length (this applies to a case where no transformer is associated with this stub). It is possible that the presence of the transformer at the junction of the stub and the main line may have an added effect upon this "end effect," since the transformer changes the configuration of the junction. Because of the involved nature of the relation between the physical dimensions of the stub and the electrical wave length thereof, it is convenient as a matter of design to dimension the stub and transformer structure so that the middle resonant frequency will occur in the neighborhood of the frequency for which the transformer has a length of a half-wave length—that is to say, the transformer is provided with a length equal to half of the wave length corresponding to the desired mid-band frequency. Because the capacitive effect of the discontinuity at the end of the transformer is small, when the stub is then adjusted for zero reflections at this frequency, the pass band may be expected to be reasonably symmetrically disposed with respect to the frequency for which the transformer is equal to a half-wave length in length. Since the exact location of the resonant frequencies is difficult because of the small amount of reflection occurring within the pass band, in practice the stub length is adjusted for a length which locates the pass band of the device with the desired amount of symmetry with respect to the frequency for which the transformer is equal to a half-wave length.

Illustrative dimensions for the stub and associated transformer structure shown in Figs. 1, 2, and 3, referred to the wave length, are given in the following table:

Table I

[Normal wave length in air=1]

| Dimension | Length |
| --- | --- |
| Outer diameter of conductors 6 and 9 | 0.096 |
| Inner diameter of conductors 7 and 10 | 0.201 |
| Length of sleeve 13 | 0.500 |
| Outer diameter of sleeve 13 | 0.109 |
| Length of stub (measured as indicated by dimension $a$ on Figs. 1 and 2) | 0.372 |

The transformer arrangement shown in Fig. 1 may be used to counteract the frequency sensitivity of devices other than supporting stubs — for instance, circuits of the parallel resonant type connected across the line either directly or by means of a branch line. Likewise, stubs of a length greater than the quarter wave length, such as ¾ wave length stub, may be associated with a transformer arrangement in accordance with the present invention in order to reduce frequency sensitivity. The input susceptance of a stub any odd number of quarter-wave lengths long and short-circuited at its farther end is known to be similar to that of a parallel resonant tuned circuit. Where the stub or parallel resonant tuned circuit has a greater sensitivity to frequency changes than the simple quarter wave stub support, as might, for instance, be the case with a stub ¾ of a wave length long, it may be desirable, in order to maintain a wide bandwidth, to increase the frequency-sensitivity of the compensating transformer arrangement by either increasing the thickness of the sleeve 13 or else using a sleeve with a total length of three half-wave lengths. Thus, as previously mentioned, in order to obtain results such as those above described, the transformers on each side of the stub may, in general case, be any odd number of quarter-wave lengths long, provided they are both of the same length. If these transformers are both made to be ¾ of a wave length long, the total transformer lengths will be three half-wave lengths.

Referring to the diagram of Figs. 4, 5, and 6, whereas increasing the thickness of the sleeve 13 increases the radius of the circles drawn about $Y_1$ and passing through $Y_0$, lengthening the sleeve to a length of approximately 1½ wave lengths does not vary the radius but increases the displacement of points such as B and D along the circumference of the circle for a given change in frequency.

It should be noted at this point that the circle diagrams in the drawings have been greatly simplified in order to clarify the principles of the invention. It is to be understood that although a semi-circular arc such as the arc $Y_0A$ of Fig. 4 corresponds exactly to 90 electrical degrees, within such semi-circle there is no fixed proportionality between degrees of arcs and electrical degrees, the electrical degrees being "crowded together" in the left hand quadrants and being spread apart in the right hand quadrants. This distinction is of relatively small importance in the above considered instances, although it will be seen to have some bearing on other cases hereinafter treated. Another feature of the circle diagram for the calculation of admittances which has been neglected for purposes of simplicity is the fact that the family of circles relating to a point $Y_1$ is not a family of concentric circles drawn about $Y_1$, but a family of circles drawn about points to the right of $Y_1$ which approach $Y_1$ as the radius of the circles decreases. In order that the nature of the simplification that has been made in the circle diagrams may be clear, there is illustrated in Fig. 19 a family of circles relating to a point $Y_1$, and also a family of semi-circles orthogonal to the said family of circles, which indicate the spread of electrical degrees about the circumference of the circles.

It will be seen that the sixty degrees of arc near the right hand intersection with the real axis includes a greater number of electrical degrees for the smaller circle than for the larger circle. This would seem to indicate that a $$\frac{3\lambda}{2}$$

total transformer length with a smaller transformer radius would be more desirable than a $$\frac{\lambda}{2}$$

total transformer length with a greater transformer radius. The points corresponding to the points B and C for a $$\frac{3\lambda}{2}$$

transformer, however, would move around the circumference of the circle at three times the rate that the points B and C move for the $$\frac{\lambda}{2}$$

transformer, for a given rate of change of $\lambda$, so that in this respect the $$\frac{\lambda}{2}$$

transformer would appear to give the greater bandwidth. The latter effect is probably predominant, but since the two effects here pointed out to some extent balance each other, it may be desirable to employ $$\frac{3\lambda}{2}$$

transformer arrangement in some cases and $$\frac{\lambda}{2}$$

transformers in other cases.

The clockwise travel around the circle and the orientation (sense) of the inductance and capacitance vectors is in accordance with the conventions applicable when looking toward the generator. In the devices here in question, it makes no practical difference which way power is transferred. It is also to be noted that although the graphical method of description is used herein because of its relative clarity of presentation, the behavior of the devices can also be derived mathematically by known analytical methods, by which the resonant frequencies of transmission in given cases can be calculated.

Although with respect to the simplicity of construction and reliability of operation and for other reasons it is preferred in the practice of this invention to provide the quarter-wave transformers directly adjacent to the supporting stub, so that they combine to form a single half-wave transformer, it is not necessary, in order to take advantage of the principles of the present invention, that this type of construction be followed. For instance, each of these quarter-wave transformers may be moved one half-wave length away from the supporting stub in question, as shown in Fig. 10. In the arrangement shown in Fig. 10, the quarter-wave length transformers 20 and 21 are so located that the distance from the axis of the stub line 8 to the nearer end of each of these transformers is substantially a half-wave length—i. e. twice the length of one of the quarter-wave transformers. The behavior of such an arrangement is illustrated by the diagram, Fig. 11. The effect of the first quarter-wave transformer, for instance the transformer 21, is indicated by the arc $Y_0W_1$ for some frequency lower than the desired mid-band frequency, which mid-band frequency may, as previously indicated, be that for which the transformers 20 and 21 each are a quarter-wave length long. The effect of the first half-wave length of transmission line between the first transformer and the stub 8 will then correspond to the arc of the large circle $W_1W_2$, going about the circle in a clockwise direction. Just as the arc $Y_0W_1$ was somewhat less than a semi-circle, the arc $W_1W_2$ will be proportionately less than a full circle. Assuming now that the frequency in question is that corresponding to the lower resonant frequency of the system, the susceptance added by the stub 8 at its point of connection with the transmission line 5 may be represented by the downwardly directed line $W_2W_3$. The effect of the second half-wave length of line located between the stub 8 and the second quarter-wave transformer may then be represented by the arc $W_3W_4$, being again somewhat less than a full circle. and the effect of the second quarter-wave transformer, for instance the transformer 20, may then be represented by the arc $W_4Y_0$. In this arrangement a change in frequency affects the position of the point $W_2$ both by shortening or lengthening the arc $Y_0W_1$ and by a similar effect on the arc $W_1W_2$. The frequency sensitivity of the compensating transformer system will, therefore, tend to be greater than that of the transformer system of Fig. 1, so that for a given supporting stub the wall thickness of the sleeve mounted upon the conductor 6 to form the transformers 20 and 21 of Fig. 10 may be thinner than that of the sleeve 13 of Fig. 1. It is to be noted in connection with Fig. 11 that the locus of points such as $W_2$ is not exactly a circular arc but the deviation of this locus from a circular arc may be expected to have a negligible effect within the limits of the pass band of frequencies.

Another possible arrangement according to this invention is one similar to that of Fig. 10 but with half-wave length transformer line sections instead of the sections 20 and 21 with their nearer extremities in this case an odd number of quarter-wave lengths from the axis of the stub line. Such an arrangement of transformers would have less frequency sensitivity than the transformer arrangement of Fig. 10. The analysis of the behavior of such a system may be made by means of diagrams similar to Fig. 11. From the foregoing discussion. it follows that the whole section of transmission line between the farther ends of the transformer sections, including any portion of line such as that between the sections 20 and 21, acts as an admittance-transforming portion of line. It is important that the total length of such transforming portion (i. e. twice the distance from the axis of the stub to either end of the transforming portion of line) should, in the case of transformers including portions of increased characteristic admittance, be approximately an odd number of half-wave lengths. whether the length of the sections of increased characteristic admittance is an even or odd number of quarter-wave lengths. Indeed. when the total length of the transforming portion is approximately so adjusted, the sections of increased characteristic admittance may be of some other length than an integral number of quarter-wave lengths, provided they are both of the same length, but since this also shifts the middle resonant frequency by an amount which is not easy to calculate in a general way, the latter type of arrangements are not preferred.

Another possible arrangement of transformers in the line 5 for compensating for the frequency sensitivity of the supporting stub 8 over a definite range of frequencies is shown in Fig. 12. In this case the quarter-wave transformers are of the "under-cut" type and the distance from the axis of the stub 8 to the nearer end of either of these transformers is an odd number of quarter-wave lengths. which in the case of Fig. 12 is a single quarter-wave length. In Fig. 12 the conductor 6 is provided with portions of reduced diameter which appear at 22 and 23. these reduced diameter portions of the conductor 6 cooperating with the outer conductor 7 of the line to define admittance transforming sections of line. These reduced diameter portions of the conductor 6 each have a length of a quarter-wave length, such quarter-wave length being referred to a frequency approximately in the middle of the desired transmission band. The frequency sensitivity of this arrangement of compensating transformers is intermediate between that of the transformer arrangement of Fig. 1 and that of the transformer arrangement of Fig. 10. The behavior of the arrangement of Fig. 12 may be illustrated by theoretical admittance diagram similar to Figs. 4–9 and Fig. 11 and the manner of such representation may be understood without further explanation. In such representation, the point $Y_1$ will, of course, lie to the left of $Y_0$ so that an arc drawn about $Y_1$ beginning at $Y_0$ in a clockwise direction will begin downward.

Similarly to the considerations raised in connection with Fig. 10, the arrangement of transformers shown in Fig. 12 may be modified by making the sections of line having reduced characteristic admittance a half-wave length long instead of a quarter-wave length long, provided that the total distance from the junction of the stub and the main line to the farther end of either section of reduced characteristic admittance is made to be an integral number of half-wave lengths. Indeed, the length of the sections of reduced characteristic admittance may be some length other than an integral number of quarter-wave lengths, provided both such sections are of the same length and provided that the location of said sections is correspondingly adjusted, but the latter type of arrangements are not preferred because of the more involved nature of design calculations and because of decreased linearity of frequency-sensitivity compensation that may be expected in such cases.

As previously mentioned, the transformer arrangement of Fig. 1 is preferred for its simplicity of construction and for other reasons. The frequency sensitivity of the transformer arrangement is quite adequate, even with small sleeve thicknesses, to counteract in the desired manner the frequency sensitivity of the supporting stub. Figs. 13 and 14 show modifications of the arrangement of Fig. 1 for the application of the principles of the present invention to specific problems more complicated than the provision of a simple stub support structure. Fig. 13 shows a symmetrical double stub support for a transmission line, such double stub support being useful for transmission lines intended to be rotated about the line axis, since the symmetry of the arrangement provides dynamic balance in the case of such rotation. In Fig. 13 the transmission line is shown at 5 and the symmetrically disposed stub supports are indicated at 25 and 26. An enlargement of the conductor 6 is shown at 27 which has a total length of a half-wave length for a frequency approximately in the middle of the desired pass band, and this constitutes a pair of adjacent transformers symmetrically disposed about the common axis of the stubs 25 and 26. As in the case of the structure of Figs. 1, 2, and 3 the stubs 25 and 26 have an electrical length slightly greater than a quarter-wave length at the frequency for which the transformer 27 is a half-wave length long, in order that the capacitance effect produced at the extremities of the transformer 27 may be compensated for. The combined effect of the stubs 25 and 26 is a greater frequency sensitivity than that produced by a single stub, so that the transformer 27 will, other things being equal, require a greater sleeve thickness than was necessary in the case of the sleeve 13.

Fig. 14 shows the application of the present invention to the junction with the main transmission line of a branch line which is adapted to be short circuited at a suitable place when a predetermined power level is reached by the oscillation in the main transmission lines. Such branch lines are employed in radio-echo location and detection system in which transmission and reception of radio waves is effected over a single antenna system fed by a single transmission line. In Fig. 14 the main transmission line, which in a radio-echo location and detection system would usually be the transmission line connecting the transmitter apparatus with the antenna, is shown at 30 and comprises an inner conductor 31 and an outer conductor 32. A branch transmission line leading toward a short circuiting device and eventually to the receiver is shown at 35 and comprises an inner conductor 36 and an outer conductor 37. The branch transmission line 35 meets the transmission line 30 at a right angle junction at which junction the inner conductors 36 and 31 are supported with respect to the outer conductor structure by means of a stub transmission line 40 which includes an inner conductor 41, an outer conductor 42 and a terminal short-circuiting plug 43. The branch line 35 is terminated by a loop 45 which is adapted to couple into a tuned electrical breakdown device through which the receiver input is connected to the line 35. Such coupling is effective when the end of the line 35 is soldered or otherwise secured and electrically connected into a suitable aperture in the walls of the said electrical breakdown device. When the radio frequency energy in the line 30 reaches a predetermined amplitude, an electrical breakdown will occur in the breakdown device into which the loop 45 is coupled. The breakdown of the electrical breakdown device will so be tuned to said device as to produce a very low impedance coupled electromagnetically to the loop 45, so that the loop 45, except for a certain amount of inductive loading, which is commensurate with the amount of loading produced by the loop in the absence of any neighboring resonator or breakdown device, will act as a short-circuit termination of the line 35. The said inductive loading will affect the electrical line length when the line acts as a short-circuited line. The loading occurring at the loop 45 is sufficient in amount to make it impractical so to adjust the line that when breakdown occurs in the breakdown device the line will behave as a short-circuited line of an electrical length of a quarter-wave. Such an arrangement would require the loop 45 to be placed much too close to the line 30 for convenience of construction. The line 35 is, therefore, designed so that when breakdown occurs in the associated breakdown device, the line 35 acts as a short-circuited transmission line of an electrical length of ¾ of a wave length.

At the junction of the lines 30 and 35, during conditions of electrical breakdown in the breakdown device associated with the loop 45, there will be two structures which contribute frequency-sensitivity which it would be advantageous to counteract by a suitable transformer structure in accordance with the principles of this invention. These two structures are the supporting stub 40 and the short-circuited line 35, the latter contributing a greater portion of frequency-sensitivity on account of its greater length. To counteract this frequency-sensitivity in accordance with the present invention, a sleeve is provided upon the conductor 31 of a length equal to a half-wave length for a frequency approximately in the middle of the desired transmission band and symmetrically disposed about the junction of the lines 30 and 35. This sleeve is shown at 47. Because of the greater amount of frequency-sensitivity in the lines 35 and 40, as compared with the two stubs 25 and 26 of Fig. 13 or, a fortiori, the single stub 8 of Fig. 1, the sleeve 47 will generally be of a greater thickness than the sleeve 27 of Fig. 13 and will consequently have a greater thickness than the sleeve 13 of Fig. 1.

The branch line 35 is provided with an additional quarter-wave transformer formed by the sleeve-like enlargement 48 of the conductor 36. The matching transformer sleeve 48 is necessary to supplement the half portion of the sleeve 47 which lies in the path of transmission around the corner. The sleeve 48 may be made slightly thicker than the sleeve 47 on account of the fact that transmission around the corner of a T-junction is ordinarily accompanied by some reflection unless these reflections are matched out by a transformer as more fully explained in connection with Fig. 15 in which the matching transformer 65 corresponds to the sleeve transformer 48. Because conditions usually require the sleeve 47 to be thicker than the sleeve 58, the sleeve 48 is in general thicker than the sleeve 65. The presence or absence of the transformer sleeve 48 is of little or no consequence during the time for which a breakdown occurs in the protective breakdown device to which the branch line 35 may be connected, and while the loop 45 consequently acts as a substantial short circuit. When it is desired to employ the transmission line 35 as a non-resonant transmission line, for instance, in order to conduct a received signal from the transmission line 30 into the transmission line 35 and then through the electrical breakdown device (not shown), which during conditions of reception will not be broken down, but will pass signals from its input coupling to its output coupling, and finally to a receiver, it then becomes important to obtain a good degree of energy transfer between the transmission line 30 and the transmission line 35. The sleeve 48 then functions to provide such energy transfer. The sleeve 48 is preferably provided with a diameter slightly larger than the diameter of the sleeve 47. Its length is governed by the same principle, substantially, as the length of the sleeve 65 as described more fully below, and the illustrative dimensions there given in connection with the latter may be applied to the sleeve 48 of Fig. 14. If the sleeve 48 is omitted, energy transfer between the transmission line 30 and 35 may be improved by increasing the size of the loop 45, but this has the disadvantage of making the loop 45 so large as to bring it near the glass vacuum-maintaining envelope usually located in the electrical breakdown device and thereby causing corona to occur.

Figs. 15 and 16 show a form of structure in accordance with the present invention which may be readily converted from a "straight through" stub support of the general type shown in Fig. 1 into a "right angle" stub support (which is a stub support provided at a right angle corner of a transmission line). When the apparatus of Fig. 15 is employed as a "straight through" stub support, a short-circuiting and mechanically supporting plug is soldered into the branch line 50 as shown at 51 by dotted line. The conductors 55 and 56 of the main line 57, the length of the stub line 50 as closed by the plug 51, and the dimensions of the enlargement 58 which constitutes the transformer system of the device, may be, as in Fig. 1 and more particularly described in Table I. As will be presently more fully described, the inner conductor of the branch line 50 has a greater thickness than the corresponding inner conductor line of Fig. 1, but, as pointed out above, the chief effect of this is to change slightly the characteristic admittance of the branch line 50 to a higher value. This change does not in this apparatus have any significant effect upon the behavior of the device, although theoretically it might vary the bandwidth slightly, so that with the arrangements just described, which is to say with the branch line 50 short-circuited by the structure 51 and with the line 57 employed to transmit energy past the branch line and its associated transformer structure, the apparatus shown in Fig. 15 operates in the same manner as that previously described in connection with Figs. 1, 2, and 3.

When it is desired to operate the apparatus shown in Figs. 15 and 16 as a right angle piece of transmission line with a stub support at the right angle, the plug 51 is removed or omitted and instead a plug shown in dotted lines at 61 is inserted at a suitable location in the line 57 at one side of the junction of the branch line 50 and the main line 57. Although the plug 61 is shown as a simple perforated disc and the plug 51 is shown as a flanged disc, it is to be understood that either type of plug may be used in either position. If the flanged disc is used, not only is there no change of diameter in the short-circuited line, but the end of the thickened portion of the inner conductor of the line may be used for the purpose of locating the plug in the desired position by suitably adjusting the length of the flange on the plug. If a simple perforated disc plug such as the plug 61 is used, the effect of the change of diameter occurring in the short-circuited line may be compensated by a small displacement of the position of the plug 61 from that which would otherwise be used. The necessary displacement can be estimated by suitable calculation and in any event can readily be determined by experimental measurement. Because of the non-symmetry of the end effects occurring at the junction of the lines 50 and 57, the distance between the short-circuiting termination of the line 50 when it is used as a stub support and the axis of the conductor 55 is likely to be different (generally somewhat longer) from the distance between the nearer wall of the plug 61 and the axis of the conductor 52, which is the inner conductor of the line 50. It may thus be convenient to provide a plug with two sleeve-like flanges, one on each face of the plug, these sleeve-like flanges being of different lengths, one suitable for locating the plug in the manner of the plug shown in dotted lines at 51 and the other suitable for locating the plug in the line 57 with reference to end of the transformer 58.

When a plug such as the plug 61 has been provided at a suitable location in the line 57 as shown in Fig. 15, the portion of the line 57 between the plug 61 and the junction of the lines 50 and 57 act as a stub support and the line is then adapted for transmission of radio frequency energy between the lines 57 and 50 around the right-angle junction. For frequencies in the microwave range at which the inner diameter of the outer conductor 56 is ⅛ of a wave length or more it has been found by experiment to be impossible to adjust the position of the plug 61 to obtain zero shunt admittance where the stub line joins the right angle connection of the lines 57 and 50. The position of the plug 61 is, therefore, adjusted so that the susceptance will be zero, which is possible, but there remains a real component (i. e. a conductance) of the admittance of the stub support. Thus it is desirable to provide in the branch line 50 not only a quarter-wave transformer to cooperate with half of the half-wave length transformer 58 to counteract the frequency-sensitivity resulting from the susceptance of the stub support, but also an additional change in the relative diameters of the conductors of the line 50 for a length of an electrical quarter-wave length such as is adapted to compensate or "match out" the conductance occasioned by the corner stub support. These two functions are combined into a single sleeve type transformer in the apparatus of Figs. 15 and 16. The conductor 52 is provided with a portion of enlarged diameter 65 extending for an electrical quarter-wave length from the joint between the conductor 52 and the conductor 55. Such an enlargement may readily be provided by means of a sleeve mounted upon the conductor 52. In determining the physical length of the enlargement 65 which corresponds to an electrical quarter-wave length, account must be taken of the "end effect" resulting from the configuration of the conductors of the lines 50 and 57. Illustrative values which have been found suitable for the physical dimensions in questions are listed below in Table II.

The thickness of the sleeve which produces the enlargement 65 is greater than the thickness of the sleeve which forms the enlargement 58 of the conductor 55, because of the additional effect which must be compensated for by the enlargement 65, as just described. The behavior of the apparatus shown in Figs. 15 and 16 when used as a right angle stub support for transmission of energy through the lines 57 and 50 around the corner formed by their junction is illustrated in Figs. 17 and 18. In this illustration of the behavior of the arrangement, as in the case of Figs. 4, 5, 6, and 11, the capacitive effect of the discontinuities occurring at the ends of the transformers is omitted in order to simplify the illustrations of the behavior of the apparatus. This small additive effect may readily be taken into account in the manner illustrated in connection with Figs. 7, 8, and 9. Fig. 17, then, illustrates the case for which the total length of the transformer 58 is a half-wave length and the total length of the transformer 65 is a quarter-wave length, and for which the stub support has a zero susceptance, although, as previously pointed out, it has a definite non-zero conductance. Beginning the analysis at the bottom of the transformer 58, the effect of the half of the transformer 58 which lies below the axis of the branch line 50 may be represented by the semi-circular arc $Y_0F$. The effect of the stub support, which, as just pointed out, is a pure conductance, may then be represented by a horizontal line $FG$. The thickness of the sleeve which acts to form the transformer 65 is designed to be exactly so much greater than the thickness of the sleeve which forms the transformer 58, that at this frequency the admittance looking into the transformer 65 from the line 50 will appear to be $Y_0$, and consequently the effect of the transformer 65 is represented on Fig. 17 by the semi-circular arc $GY_0$ drawn about a point $Y_2$ which point corresponds to the desired characteristic admittance of the transformer 65 and determines the transverse dimensions of the latter. At some lower frequency than that corresponding to the conditions of Fig. 17 a relation will be established such as that shown in Fig. 18. In this case the effect of the lower half of the transformer 58 is shown by the arc $Y_0F'$. The stub support now has a susceptance component $F'H$ as well as a conductance component $HG'$ so that the resultant admittance of the stub is represented by the line $F'G'$. The effect of the transformer 65 may then be represented by the arc $G'Y_0$ drawn, again about the point $Y_2$ as center.

It is to be noted that the line $F''G'$ will be slightly unsymmetrically disposed about the axis $YY'$ and further that the difference between the diameter of the two arcs will generally be such as to compensate for the conductance of the stub only in the neighborhood of the mid-band frequency for which the conditions were shown in Fig. 17. The variations of the admittance looking through the right angle stub structure arising from this last mentioned circumstance will generally be extremely small within the range of frequencies usually desired.

The transition between the transformer 65 and the transformer 58 at the junction of these two structures may be carried out in various ways, the difference between the outer diameters of these two structures being so small that the effect of varying the manner of the transition within reasonable limits is difficult to measure. A preferred configuration for this joint is shown in Figs. 15 and 16. If desired, the circumferential edges at the junction end of the transformer 65 may be slightly rounded. Dimensions for a structure of the type shown in Figs. 15 and 16 which have been determined in accordance with the present invention and have been found practical are given in Table II.

*Table II*

[Mid-band wave length in air=1.]

| Dimension | Length |
| --- | --- |
| Outer diameter of conductors 52 and 55 | 0.096 |
| Inner diameter of conductors 53 and 56 | 0.201 |
| Length of sleeve 58 | 0.500 |
| Outer diameter of sleeve 58 | 0.109 |
| Length of sleeve 65 (dimension b on Figs. 15 and 16) | 0.293 |
| Outer diameter of sleeve 65 | 0.114 |
| Length of stub for "straight through" line (dimension c on Figs. 15 and 16) | 1.321 |
| Length of stub for "right angle" line dimension d on Fig. 15) | 1.281 |

1 For flat disk form of plug.

Sections of transmission line for assembly into radio frequency transmitting and receiving systems in a wide variety of possible physical constructions may be provided in the form of sections of coaxial conductor line having a structure such as that shown in Figs. 15 and 16 at each end of the line. Either end of the sections may then be used for a straight through connection or for a right angle connection. The arrangement of Figs. 15 and 16 simplifies the manufacturing problem by providing a structure which will serve either as a straight through stub support or as a right angle stub support, the choice being determined and effected simply by the location of a short-circuiting disk or plug.

In the foregoing description and explanation, the most practical forms of the present invention, together with certain variations thereof, have been described and their behavior has been explained with the help of simplified theoretical diagrams. For the full understanding of the principles of the present invention from the theoretical point of view and for a full appreciation of the scope of its application, further examples should be considered, some of which may not at present have an immediate practical application because of the greater convenience of the preferred forms of the invention. Accordingly, there are shown in Figs. 20-29 certain other forms of the invention together with explanatory diagrams relating thereto.

It will be seen from the above description that the invention in principle consists in associating with a transmission line which is connected with a resonant structure that introduces frequency-sensitivity, a resonant transformer so arranged that the frequency characteristic of the resonant transformer and the frequency characteristic of the aforesaid resonant structure or element will substantially compensate each other over an appreciable range in the neighborhood of the resonance of the latter. The term "resonant" is used in the broad sense to include both "series" and "parallel" resonance, the latter being sometimes referred to as "anti-resonance". In general, the arrangement in question includes the provision of a resonant transformer such that at the frequency at which the said resonant structure is resonant (or anti-resonant, as the case may be), and at which it therefore does not introduce a finite non-zero susceptance, the resonant transformer also has a zero net effect so far as the production of reflections in the transmission line is concerned, the transformer further being such that it will exactly compensate the reflection-producing effect of the said resonant element at two other frequencies in the neighborhood of the said resonant frequency (except for a special case in which one of these frequencies coincides with the "middle" resonant frequency). The manner in which the resonant transformer is to be designed and associated with the resonant element in the case where the resonant element is substantially a parallel resonant circuit in shunt with a transmission line (for instance, a stub support) and where the transformer consists of suitably spaced alterations in the characteristic impedance of the transmission line, has been fully illustrated in the figures above referred to and in the description relating thereto (except for a special case to be taken up presently in connection with Figs. 28 and 29). The invention is, however, applicable to reducing the frequency-sensitivity which normally results when a series resonant circuit or its equivalent is inserted in series with one of the conductors of a transmission line. It also applies to arrangements making use of a resonant transformer of the double-stud type as well as to resonant transformers of the type involving changes in the characteristic impedance of the transmission line. As a corollary, the invention also applies to the use of transformers of a type combining the features of the double-stub and change-of-characteristic-impedance types.

Fig. 20 illustrates the use of a double-stub type of resonant transformer for counteracting the frequency-sensitivity of a stub support 70 associated with a transmission line 75 through which it is desired to transmit energy. The behavior of this arrangement is illustrated in Fig. 21. The stub support 70 corresponds to the stub 8 of Fig. 1. On either side of the supporting stub 70 an additional stub line, shown respectively at 71 and 72, is provided. The stubs 71 and 72 together with the intervening portion of the line 75 form a resonant transformer of the double-stub type which is for best results symmetrically disposed with respect to the stub support 70, of which it is desired to counteract the frequency-sensitivity. The stub 71 and 72 are not resonant at the frequency at which the stub 70 is resonant. In general, the stubs 71 and 72 should introduce a capacitive susceptance at their respective junctions with the transmission line 75 and the frequency at which the stub 70 is parallel-resonant, and they should be located at a distance from the stub 70 slightly less than one, five, nine, etc., eighth-wave lengths, preferably slightly less than a single eighth-wave length. The distance between the stubs 71 and 72 will thus be slightly less than an odd number of quarter-wave lengths.

In order that the stubs 71 and 72 may be capacitive and also not excessively frequency-sensitive, they are provided with open-circuit terminations. If the outer conductor of the stub is extended a relatively long distance beyond the end of the inner conductor, and is small enough in diameter, the end may be either open or closed, as radiation will then be negligible in either case. The stubs 71 and 72 constitute a special type of shunt reactance. Other shunt reactive arrangements might be used. If desired, short-circuited stubs of a length between a quarter-wave and a half-wave length may be substituted for the shorter open-circuited stubs (which should be less than a quarter-wave length long), with some increase in frequency-sensitivity, however, and probably with some loss in overall band-width.

It will presently be pointed out in connection with Fig. 21A that the stubs 71 and 72 may be replaced by inductive stubs located about a quarter-wave length away from the suitable location of the capacitive stubs 71 and 72 respectively, without substantially changing the behavior of the apparatus except for the introduction of additional frequency-sensitivity in the transformer (and possible reduction of band-width of the entire device) on account of the greater length of transmission line 75 between the stubs of the double-stub transformer. The substitution of inductive for capacitive stubs and the concomitant change of the spacing from each of said stubs to the stub 70 by a quarter-wave length is analogous to the substitution of the undercut transformers 22 and 23 of Fig. 12 for the sleeve transformer structure 13 of Fig. 1.

The reasons underlying the choice of the characteristics of the stubs 71 and 72 and of the spacing between them, and also the mode of operation of the arrangement shown in Fig. 20, may be explained in connection with the diagram, Fig. 21. The point $Y_0$ indicates the characteristic admittance of the transmission line 75. As previously pointed out, the stubs 71 and 72 are capacitive in effect over a range of frequencies in the neighborhood of the anti-resonant frequency of the stub 70. The effect of the stub 71 at the said anti-resonant frequency may therefore be represented by the straight line $Y_0L_1$. The distance between the stub 71 and 72 is so arranged that at the said anti-resonant frequency the admittance looking to the left from the intersection of the stub 72 and the line 75, disregarding the effect of the stub 72, is represented by the point $L_3$ which is to say that the length of transmission line between the stub 71 and 72 is such as to correspond to the number of electrical degrees represented by the arc $L_1L_2L_3$. In the previous circle diagram it was not of particular importance to consider the distribution of electrical degrees about the arc drawn on the diagram, because although the electrical degrees are not uniformly distributed about the arc (see Fig. 19), an arc of a circle drawn about a point on the real axis $YY'$ always includes 90 electrical degrees between its intercepts on the real axis. A glance at Fig. 19 will show that the arc $L_1L_2L_3$, although geometrically more than 180 degrees, will amount to less than 90 electrical degrees, which is to say that the length between either the stub 71 or the stub 72 and the stub 70 should be somewhat less than an eighth-wave length (or, in general, somewhat less than one, five, nine, etc., eighth-wave lengths). Since the stub 70 is anti-resonant at the frequency just considered, it will not affect the diagram $Y_0L_1L_2L_3Y_0$. The effect of the stub 72 is represented by the vertical line $L_3Y_0$, so that at the frequency in question the transmission line is perfectly matched through the structure. It is to be noted that in this case the circular arcs belong to the family associated with $Y_0$, the point representing the characteristic admittance of the transmission line, which is unchanged throughout.

At some frequency lower than the anti-resonant frequency of the stub 70, the situation represented by the line $Y_0M_1M_2M_3M_4Y_0$ will hold. At this lower frequency, the capacitive admittance of the stubs 71 and 72 will be less than that at the anti-resonant frequency of the stub 70, and will, therefore, be represented by the lines $Y_0M_1$ and $M_4Y_0$ respectively. The change in the admittance looking to the left from various points on the transmission line 75 between the stubs 71 and 72 will then be represented by the arcs $M_1M_2$ and $M_3M_4$, which are shorter than the corresponding arcs $L_1L_2$ and $L_2L_3$ on account of the lower frequency in the case now being considered. The stub 70, however, will have an inductive effect at this lower frequency, so that its effect will be represented by the line $M_2M_3$, and it will thus be seen that there will be a frequency for which the line $Y_0M_1M_2M_3M_4Y_0$, bringing the admittance back to $Y_0$ at the intersection of the stub 72 and the line 75, will be representative. Likewise, there will be a frequency higher than the anti-resonant frequency of the stub 70 for which the diagram $Y_0N_1N_2N_3N_4Y_0$ will represent the conditions in the apparatus, the susceptance of the stubs 71 and 72 now being greater as shown by the lines $Y_0N_1$ and $N_4Y_0$, the effect of the intervening portion of the transmission line 75 being to introduce a greater number of electrical degrees as shown by the length of the arc $N_1N_2$ and $N_3N_4$, which overlap in the portion $N_3N_2$, and the effect of the stub 70 now being capacitive as shown by the straight line $N_2N_3$.

The case in which each of the stubs 71 and 72 are replaced by an inductive stub located a quarter-wave length farther out from the stub 70, for instance the stub shown in dotted line at 73, a similar stub being substituted for the stub 72 on the other side of the stub 70, is illustrated in the diagram Fig. 21A (on the last sheet of drawings). The somewhat greater frequency-sensitivity of the transformer arrangement is shown by the fact that the arcs involved in the diagram are longer. The mid-band resonant frequency of the device is represented by the diagram $Y_0L'_1L'_2L'_3Y_0$. The effect of the stub 70, which appears at the point $L'_2$, is zero, this being the anti-resonant frequency of the stub 70. The arc $L'_1L'_2$ and $L'_2L'_3$ overlap in a portion of $L'_1L'_2$. It will be seen from the length of the arc $L'_1L'_2L'_3$, and from a reference to Fig. 19, that the distance between the inductive stubs here considered will be slightly greater than three-quarters of a wave length, so that the distance between the stubs 71 and 73 on Fig. 20 should be more than a quarter-wave length instead of a quarter-wave length as previously suggested. This is, however, a minor adjustment, and its extent may be readily calculated with the help of circle diagrams of the type of Fig. 21 and Fig. 21A. For a frequency lower than the middle resonant frequency there will be another resonant transmission frequency of the device indicated by the line $Y_0M_1M_2M_3M_4Y_0$. The arcs in question now have a smaller number of electrical degrees, while the lines representing the inductive susceptance of the stubs of the double-stub transformer have a smaller magnitude. The effect of the stub 70 is inductive and is shown by the line $M'_2M'_3$. At a frequency higher than the aforesaid middle resonant frequency of the device there will be another resonant frequency of transmission as illustrated by the line $Y'_0N'_1N'_2N'_3N'_4Y'_0$. The effect of the transformer stub is now to introduce a susceptance of greater absolute magnitude, while the arcs in question are longer in terms of electrical degrees and the effect of the stub 70 is capacitive as shown by the line $N'_2N'_3$.

The exact length of the stubs 71 and 72, and, in the case of Fig. 21A, of the stub 73 of Fig. 20, is not critical so long as the stubs 71 and 72 are capacitive in the desired range and, in the other case, so long as the stub 73 is inductive in the desired range. The magnitude of the susceptance provided by the stub at the middle transmission frequency determines the radius of the arc $L_1L_2$ of Fig. 21 and the arc $L_1'L_2'$ of Fig. 21A, so that it is in a sense analogous to the magnitude in the change of characteristic impedance effected by the sleeve 13 of Fig. 1 or by the undercut portions 22 and 23 of Fig. 12. Just as the transformers of Figs. 1 and 12 may be adjusted for various degrees of compensating frequency-sensitivity by varying the proportional increase or decrease in the diameter of the conductor 6, the amount of compensating frequency-sensitivity provided by the double-stub transformer of the type generally indicated in Fig. 20 may be adjusted by proper choice of the length of the stub 71 and 72 and, in the case of inductive stubs, of the length of the stub 73 and of its mate. Since the stub reactance depends upon the characteristic impedance of the stub as well as upon the length of the stub (as mentioned in the case of the supporting stub 8 of Fig. 1), the selection of the characteristic impedance may also serve to control the frequency characteristic of the devices here described. The desired stub length for counteracting the frequency-sensitivity of a given anti-resonant element such as the stub 70 can be calculated graphically by means of circle diagrams of the type illustrated herein in accordance with the herein outlined method.

Fig. 22 illustrates the application of the invention for reducing or compensating the frequency-sensitivity introduced by a series resonant element which appears in series with one of the conductors of a transmission line. The transmission line is illustrated at 80, and the series resonant element is represented by a resonator 81 coupled to the transmission line 80 by means of a hole or slot 82 preferably elongated circumferentially with respect to the axis of the transmission line 80. The hole or slot 82 will thus interrupt currents in the transmission line 80 and an electric field will appear across it which is adapted to excite the resonator 81. The effect of the resonator 81 thus coupled into the transmission line 80 may be regarded as the interposition in series with the outer conductor of the transmission line 80 of a series resonant circuit, the resonant frequency of which is substantially the resonant frequency of the resonator 81. In order to compensate for the frequency-sensitivity of the resonator 81 for the purpose of improving the transmission characteristic of the transmission line 80, the diameter of the inner conductor of the transmission line 80 is reduced, as shown at 83, for a distance of substantially a half-wave length at the resonant frequency of the resonator 81, symmetrically disposed with respect to the coupling aperture 82, so that this section of transmission line having an inner conductor of reduced diameter may be regarded as a half-wave "undercut" resonant transformer, or as a pair of quarter-wave "undercut" resonant transformers with their ends joined. The behavior of the arrangement of Fig. 22 is more conveniently illustrated upon an impedance diagram rather than upon an admittance diagram, the admittance diagram having been more convenient in the previous cases dealing with parallel resonance and shunt susceptance. The impedance diagram is essentially the same as the admittance diagram, it being understood that impedance is the reciprocal of admittance, and that both diagrams represent complex quantities. The impedance diagram, like the admittance diagram, has the general form shown in Fig. 19.

The behavior of the apparatus illustrated in Fig. 22 is shown by the diagram Figs. 22A, 22B, and 22C. The real axis in each of these diagrams is represented by the line $ZZ'$. The point $Z_0$ represents the characteristic impedance of the transmission line 80. The point $Z_1$ represents the characteristic impedance of that particular portion of the transmission line 80 in which the inner conductor has a reduced diameter as shown at 83. Following the previously employed procedure of analysis, the effect of the first half of the "undercut" section of transmission line will be represented, at the middle resonant frequency of the structure, by the upper arc $Z_0Z_2$. The resonator 81, the effect of which enters at the point $Z_2$, here has zero effect (assuming losses to be negligible), being at resonance, and therefore adds nothing to the diagram. The effect of the rest of the "undercut" transformer section is then represented by the lower arc $Z_2Z_0$. It will be seen that each of these arcs correspond to ninety electrical degrees and that the total length of the transformer is therefore 180 electrical degrees or a half-wave length. "End effects" at the extremities of the transformer section are neglected in this analysis as in most previous cases; they may be adjusted for, if desired, as previously explained in connection with Figs. 1, 7, 8 and 9, such end effects being generally the introduction of a slight amount of capacitance at the ends of the transformer section, whether the transformer is of the sleeve type or of the "undercut" type.

At a frequency lower than that considered in Fig. 22A, the arcs representing the effect of the two halves of the "undercut" transformer section will be shorter as shown in Fig. 22B. The impedance presented in series with the transmission line by the resonator 81 will then be capacitive, as indicated by the line $Z_3Z_4$ (this line is downwardly directed, since on the impedance diagram inductance is represented upwards, whereas on the admittance diagram capacitance is represented upwards). Fig. 22B represents the lower resonant transmission frequency of the device of Fig. 22.

The upper resonant transmission frequency of the device of Fig. 22 is illustrated by the diagram, Fig. 22C. In this case the arc corresponding to the effect of the two halves of the transformer are longer than 180 degrees (longer than 90 electrical degrees) each and overlap over the portion $Z_5Z_6$. The effect of the resonator 81, which is inductive, is represented by the straight line $Z_5Z_6$.

Fig. 23 illustrates the use of a double-stub type of transformer for reducing or compensating for the frequency-sensitivity introduced by a series resonant element inserted in series with one of the conductors of a transmission line. The transmission line is again shown at 80, and the series resonant element is again represented by the resonator 81 coupled to the transmission line 80 by a hole or slot 82. The transformer provided in accordance with the present invention is in this case a transformer of the double-stub type comprising the stubs 84 and 85. Just as in Fig. 22, where a series resonant element in series with the line was also involved, an "undercut" type of transformer was used, whereas in Fig. 1 where a parallel resonant element in shunt with the line was involved a sleeve type of transformer was used, so in the present case, the stubs 84 and 85, for the shortest type of transformer, should be inductive, in contrast to the use of capacitive stubs in the arrangement of Fig. 20. As will appear from a consideration of Fig. 24, for the shortest transformer the stubs 84 and 85 should be separated by slightly less than a quarter-wave length of the transmission line 80. As in the case of Fig. 20, an arrangement employing the other type of stub, in this case capacitive stubs, can be constructed which is substantially equivalent except for the introduction of somewhat more frequency-sensitivity in the transformer because of the increased amount of the transmission line 80 included in the double-stub transformer.

The exact counterpart of Fig. 20 for counteracting the frequency-sensitivity of the resonator 81 in Fig. 23 would comprise additional series reactances inserted in the transmission line on either side of the resonator 81, in which case the impedance diagram would look substantially exactly the same as the admittance diagram shown in Fig. 21. Although the principle of the invention may be applied to transformers including a pair of series reactances inserted in a line at a suitable distance from each other so as to constitute a resonant transformer, it is inconvenient, at least so far as the present state of the art is concerned, to insert structures which will be effectively series reactances inserted in a transmission line of ordinary construction, so that for a more practical illustration there is shown in Fig. 23 the use of shunt reactances, namely the stubs 84 and 85. The impedance diagram now becomes more complicated because both shunt and series reactances are to be considered.

The impedance diagram is shown at Fig. 24, the line $ZZ'$ being the real axis and the origin appearing at O. $Z_0$ represents the characteristic impedance of the transmission line 80. For the purpose of this diagram it is assumed that the spacing between the stubs 84 and 85 is of the order of a single quarter-wave length. It is to be understood that instead of the stubs 84 or 85 spaced, as will be seen, by slightly more than a quarter-wave length, a pair of capacitive stubs might be used spaced by slightly less than three-quarter wave lengths. It will also be seen that the spacing between the stubs can be increased by an integral number of wave-lengths without introducing changes other than an increase in the frequency-sensitivity of the transformer arrangement.

Since Fig. 24 is an impedance diagram and since the impedance of the stubs 84 and 85 is in parallel with the line 80, the resultant impedance of the parallel combination, as "seen" at the location of the stub, cannot be represented by a point on a vertical line passing through $Z_0$. The locus of the resultant impedances, instead of being a vertical line through $Z_0$, is a circle passing through $Z_0$ and the origin, and having its center on the real axis, the circle in question being shown in dashed lines on Fig. 24. On this circle the origin corresponds to zero shunt impedance or infinite shunt susceptance, and the point $Z_0$ corresponds to infinite shunt impedance or zero shunt susceptance. Thus the points corresponding to higher values of impedance of the stub will lie closer to $Z_0$ than points for lower values of impedance.

For the mid-band resonant frequency the situation will be represented by the line $Z_0\alpha_1\alpha_2\alpha_3Z_0$, the lines $Z_0\alpha_1$ and $\alpha_3Z_0$ representing the effect of the stubs 84 and 85 respectively, whereas the circular arc represents the effect of the intervening length of transmission line. For a lower frequency than that just considered the effect of the stub 84 may be represented by $Z_0\beta_1$, the effect of the first half of the transmission line lying between the stubs by $\beta_1\beta_2$, the effect of the interposed series reactance of the resonator 81 by the straight line $\beta_2\beta_3$ (the reactance being capacitive), the effect of the remainder of the transmission line included between 84 and 85 being represented by the arc $\beta_3\beta_4$ and the effect of the stub 85 being represented by the line $\beta_4Z_0$. In a similar manner there will be another frequency lower than the first-mentioned frequency which may be represented by the diagram $Z_0\gamma_1\gamma_2\gamma_3\gamma_4Z_0$. It will be noted from the diagram $Z_0\alpha_1\alpha_2\alpha_3Z_0$ and from a construction of the dashed circle onto Fig. 19 (not shown) that the arc $\alpha_1\alpha_2\alpha_3$ includes necessarily somewhat more than 90 electrical degrees, so that the spacing between the stubs 84 and 85 should not be exactly a quarter-wave length but slightly more than such. It will also be seen that as the frequency decreases the point $\beta_2$ is pulled back not only by the reduced length in the electrical degrees of the arc $\beta_1\beta_2$ but also by the increase in the electrical degrees in the portion of the circle $\beta_1\beta_2$ intercepted by the angle $\beta_1Z_0Z'$. It may similarly be observed with regard to Fig. 21 that the point $M_2$ is pulled to the left as the frequency decreases not only by the reduced length of the arc $M_1M_2$, but also by the change in scale in electrical degrees as one progresses toward circles of smaller radius (see Fig. 19). These factors, however, do not prevent transformer structure of the double-stub type of being valuable for counteracting the frequency-sensitivity of elements associated with a transmission line and may improve the quality of compensation in some cases.

If desired, the arrangement of Figs. 1 and 20 or the arrangement of Figs. 22 and 23 may be combined within the principles of the present invention. Thus in the first case the portion of the transmission line 75 lying between the stubs 71 and 72 might be arranged to have a higher characteristic admittance than the rest of the transmission line 75, as by increasing the diameter of the inner conductor of the transmission line or reducing the diameter of the outer conductor of the transmission line. In the second case just mentioned, referring to Fig. 23, the portion of the transmission line 80 between the stubs 84 and 85 might be arranged to have a higher characteristic impedance than the rest of the transmission line, as by reducing the diameter of the inner conductor or increasing the diameter of the outer conductor of the said transmission line.

If the arrangements of Figs. 20 and 1 are combined as above suggested, so that the transformer arrangement comprises a sleeve type thickening of the inner conductor of the transmission line having at each end a shunt capacitively reactive stub, the circle diagram for the middle resonant frequency will correspond to Fig. 7, except that the capacitive stubs may be expected to exhibit considerably greater susceptance than that represented by the lines $Y_0P$ and $QY_0$. The family of circle diagrams will resemble that shown in Fig. 21 except that the arcs will belong to the family of circles about a point $Y_1$, to the right of $Y_0$, instead of the family of circles about $Y_0$ as in Fig. 21. It will be seen that for the least frequency-sensitive transformer of this general type the total transformer length will be between slightly less than a quarter-wave length (Fig. 20) and a half-wave length (Fig. 1). The use of loading capacitances in this manner may be useful in cases where frequency-compensation by the method of Fig. 1 entirely would involve risk of electrical breakdown on account of reduced mechanical clearances in the line.

Figs. 25 and 27 show typical applications of the present invention to systems employing hollow pipe wave guides instead of coaxial conductor transmission lines. In Fig. 25 the rectangular pipe 90 represents the wave guide adapted to transmit waves in the $H_{0,1}$ mode, sometimes referred to as the $TE_{0,1}$ mode, and might, for instance, be used to connect a transmitter to an antenna. The pipe 91 is a similar wave guide pipe forming a junction with the pipe 90 and might conveniently be used to connect to a receiver for operating in connection with an antenna common to both transmitter and receiver. When the pipes 90 and 91 are used as suggested, it is advantageous to provide in the pipe 91 a protective electrical breakdown device which will cause a short circuit to appear in the pipe 91 when the transmitter is operated. The said electrical breakdown device (not shown) is to be located in the pipe 91 in such a position that the said short circuit is caused to appear at substantially a half-wave length from the mouth of the pipe 91 where it joins the pipe 90 so that substantially no energy will be caused to be reflected back towards the transmitter during transmitter operation, and a maximum of energy may be transmitted along the pipe 90 past the junction. The shaded rectangle 92 represents a short circuit across the wave guide 91 such as might be caused by an electrical breakdown device located as aforesaid. It will be seen that the presence of the branch pipe 91, even when short circuited even as aforesaid, will introduce frequency-sensitivity into the transmission characteristic of the pipe 90 during transmitter operation, because zero reflection towards the transmitter from the short-circuited branch holds only for a particular wave length. The present invention may be applied to reduce or counteract the said frequency-sensitivity as follows. The branch pipe 91 as shown in Fig. 25 and short-circuited at the location 92 constitute essentially a series resonant circuit interposed in series with the upper wall of the wave guide 90 which may be regarded as a sort of transmission line. The mouth of the pipe 91 will intercept longitudinal currents in the upper wall of the pipe 90, so that an electrical field will occur across the said mouth and the short-circuited branch pipe will act in a manner similar to the mode of operation of the resonator 81 in Figs. 22 and 23.

The frequency-sensitivity introduced by the short-circuited branch pipe 91 may, in accordance with the present invention, be counteracted by providing a resonant transformer of the proper kind in the pipe 90, either by changing the dimensions of the pipe, particularly the narrower dimension, thereby changing what may be termed the characteristic impedance of the pipe then regarded as a transmission element, or by inserting structures providing susceptive loading and therefore acting like the stubs 71 or 73 of Fig. 20. In Fig. 25 the latter method is shown, inductive susceptance being provided at suitably located points on each side of the wave guide junction by the pairs of curtains 93, 93a and 94, 94a. These curtains are sometimes considered as a type of "iris diaphragm." The behavior of the structure is illustrated in Fig. 26, which is substantially the same as Fig. 24. Thus the middle resonant frequency may be arranged to correspond with the situation shown by the lines $Z_0F_1F_2F_3Z_0$. The effect of the curtain pairs 93, 93a and 94, 94a are then represented respectively by the lines $Z_0F_1$ and $F_3Z_0$. The effect of the short-circuited branch pipe, which takes place at $F_2$, is zero because the frequency considered is the resonant frequency for which the length of the short-circuited branch is a half-wave length from the position of the short circuit to the mouth of the pipe. As in the case of Fig. 23, the distance between the inductive susceptance loading 93, 93a and 94, 94a should be slightly more than a quarter-wave length. Instead of quarter-wave length spacing, a spacing slightly more than five-quarters of a wave length might be used, although this would introduce slightly more frequency-sensitivity in the transformer arrangement. Likewise capacitive loading could be used instead of inductive loading at positions slightly less than a quarter-wave length farther out from the junction than the positions illustrated in Fig. 25 for the elements 93, 93a, 94 and 94a.

At some lower frequency the situation will be that represented by the line $Z_0G_1G_2G_3G_4Z_0$. At this lower frequency the short-circuited branch pipe is slightly less than a half-wave length long, so that it has a capacitive effect and is therefore represented by the downwardly directed vertical line $G_2G_3$. At the same time the spacing between the elements 93 and 94 is shortened in terms of electrical degrees so that its effect may be represented by the arcs G₁G₂ and G₃G₄. The impedance resulting from the curtain pairs 93, 93a and 94, 94a respectively, being lower than at the previously considered frequency, will be represented by Z₀G₁ and G₄Z₀. Another resonant transmission frequency for the structure will appear at slightly higher values of frequency than the middle resonant frequency, as shown by the lines Z₀H₁H₂H₃H₄Z₀.

If desired, an additional pair of curtains 95, 95a may be provided in the wave guide 91 as shown in Fig. 25 to improve the impedance match around the wave guide corner at the junction, when the transmitter previously referred to is not in operation and the short-circuit at the position 92 is therefore removed. Such pair of curtains 95, 95a would in a general way correspond to the sleeve type matching transformers 65 of Fig. 15 and 48 of Fig. 14. It may be pointed out that when the junction arrangement shown in Fig. 25 is used for purposes of reception, with energy being led around the wave guide corner instead of straight through past the junction, that branch of the wave guide 90 which is not used during reception for the transmission of energy is preferably adjusted in length or otherwise arranged to reflect energy; consequently, it will introduce frequency-sensitivity. The transformer arrangement effectively constituted by the curtain pairs 93, 93a and 95, 95a in such case tends to reduce such frequency-sensitivity in the same manner that frequency-sensitivity is reduced in the apparatus of Fig. 15 when it is used as a "corner" type stub support with the plug 61 in position and the plug 51 out of position.

It is to be noted that in pipe wave guide structures such as that illustrated in Fig. 25 the wave length of the oscillations in the guide is generally longer by a substantial amount than the wave length of oscillations of the same frequency in free space or in an air-insulated coaxial-conductor transmission line. The dimensions given in terms of wave lengths in connection with Fig. 25 are therefore to be referred to the wave length of the oscillations in the wave guide and not to be free space wave length. Since the wave length in a rectangular wave guide for the H₀,₁ mode depends only upon the broader dimension of the wave guide cross section, the narrower dimension of said cross section may be varied to change what corresponds to the characteristic impedance of the wave guide without at the same time changing the wave length in the wave guide.

If the short circuit represented by the shaded area 92 could be made to occur at the mouth of the wave guide 91, there would be substantially no problem of frequency-sensitivity, but in practice it is often inconvenient so to locate the electrical breakdown discharge apparatus associated with the wave guide 91.

The form of junction shown in Fig. 25 is known as an "electric plane" junction. A "magnetic plane" junction is shown in Fig. 27. The wave guide which goes straight through the junction is shown at 96, the branch wave guide 97 opening into one of the narrow walls of the wave guide 96. The shaded projected rectangle 98 indicates a short-circuit in the same manner as indicated by the shaded area 92. The mouth of the wave guide 97, interrupting as it does the narrower wall of the wave guide 96, will not intercept any of the longitudinal current of the inner surfaces of the walls of the wave guide 96, which flow on the broader walls of the wave guide only, but will instead intercept the lateral current flowing across the narrower wall (vertically with regards to Fig. 27). When the wave guide 96 is regarded as a transmission line, the central parts of the broader walls may be regarded as the conductors. It will therefore appear that the short-circuited branch pipe 97 is not in series with the wave guide when regarded as a transmission line but is essentially a parallel resonant circuit in shunt with the wave guide so regarded. The wave guide usually measures about one-half wave length across in its broad dimension, so that a series resonant circuit at the narrow wall will appear as a parallel resonant circuit at the center. The short-circuited "magnetic plane" junction of Fig. 27 may therefore be treated in the same manner as the stub support 70 in the line 75 shown in Fig. 20 (or indeed, as the stub support 8 in the line 5 on Fig. 1). Frequency-sensitivity introduced by the short-circuited branch may therefore be counteracted by capacitive loads in shunt with the line spaced slightly less than one, five, nine, etc., eighth-wave lengths from the center of the junction or by inductive loads spaced in accordance with Fig. 21A. Or, following the procedure of Fig. 1, the narrow dimension of the wave guide 96 might be reduced for a length of an odd number of half-wave lengths. In each case I prefer to dispose the transformer arrangement symmetrically about the junction.

In Fig. 27, the transformer arrangement is constituted by the pairs of curtains 99, 99a and 100, 100a, each pair constituting a capacitive load (an alternative arrangement of inductive loads being shown in dotted lines at 101). Because the branch pipe 97 is about a half-wave length wide, spacing of a half-wave length or less between the susceptive loads constituting the transformer would be difficult to calculate because of the likelihood of end effects on account of the presence of the junction. It is probable that end effects would not seriously interfere with a half-wave length transformer of the type produced by reducing the narrow dimension of the pipe 96 for a half-wave length, however.

The capacitive curtain pairs 99, 99a and 100, 100a are shown in Fig. 27 separated by slightly less than five-quarters of a wave length. A shorter transformer, hence less frequency-sensitive, may be formed by the inductive curtain 101 instead of the capacitive curtains 99, 99a, 100, and 100a. The curtains 101 are slightly more than three-fourths-wave length apart. They involve less risk of voltage breakdown than the capacitive curtains. Capacitive elements that do not increase breakdown hazards may be provided by suitable branch pipes, but the use of inductive elements is usually more convenient.

It may be noted here in passing that the type of junction shown in Fig. 25 is in practice usually preferred to the type of junction shown in Fig. 27 because of the better match around the corner when it is attempted to transmit energy in or out of the branch pipe, so that less elaborate matching arrangements are necessary for the best transfer of energy around the corner; indeed, in some cases the match is good enough to permit dispensing with special matching arrangements directed solely towards improving the energy transfer around the corner.

In the forms of the invention heretofore considered the compensating transformer arrangement for reducing the frequency-sensitivity of a resonant or anti-resonant element associated with a transmission line, or, more generally, a wave guide (a two-conductor transmission line being a special case of a wave guide), has been symmetrically disposed with respect to the said resonant or anti-resonant element, or, at least, part of the transformer arrangement has been located on each side of the said element. Such disposition is necessary in order that the combined structure may have three resonant transmission frequencies within the pass band as heretofore explained and described. An unsymmetrically disposed transformer arrangement may provide a certain amount of reduction of frequency-sensitivity without, however, giving the effect of a band-pass filter which is obtained with the at least partially balanced arrangements herein described. The nature and extent of the effect of providing completely unsymmetrical resonant transformer in association with a resonant element associated with a transmission line is illustrated in Fig. 28 and in the explanatory diagrams, Figs. 28A, 28B and 28C.

Fig. 28 shows a transmission line 110 provided with a supporting stub 111 substantially similar to the stub 8 of Fig. 1. A half-wave matching transformer of the "undercut" type is provided by reducing the diameter of the inner conductor of the line 110 for substantially a half-wave length corresponding to the frequency at which the stub 111 is anti-resonant, the reduction in the diameter of the inner conductor being shown on Fig. 28 at 112. The portion of line 110 in which the inner conductor has a reduced diameter extends from the junction with the stub 111 to one side for the distance of approximately one-half-wave length. The behavior of such a structure is illustrated in Figs. 28A, 28B and 28C. Fig. 28A represents the condition when the frequency is equal to the anti-resonant frequency for the stub, at which frequency the "undercut" transformer has the length of a half-wave length. The stub then has zero effect and the effect of the transformer section of line is represented by the circular arc beginning at $Y_0$ and going clockwise and downward from $Y_0$, since the characteristic admittance $Y_1$ of the portion of line having an inner conductor of reduced diameter is lower than the characteristic admittance of the rest of the line 110.

Fig. 28B shows a situation at frequencies lower than that corresponding to Fig. 28A. The effect of the stub is inductive and may be represented by the line $Y_0Y_2$. The length of the transformer is less than 180 electrical degrees so that the arc $Y_2Y_3$ is less than a full circle. For one particular frequency the point $Y_3$ will lie on the real axis YY', but it will be at some other point than the point $Y_0$.

Fig. 28C shows the condition at frequencies higher than that corresponding to Fig. 28A. The effect of the stub is then capacitive and may be represented by the line $Y_0Y_4$. The transformer has an electrical length greater than 180 electrical degrees so that the circular arc representing the effect of the said transformer will be longer than a full circle. For some particular frequency the other end of the said arc will lie on the real axis YY' at a point $Y_5$, but such point will again be some point other than the point $Y_0$. Thus at all frequencies other than that corresponding to Fig. 28A, there will be some reflection caused by the structure shown in Fig. 28 in the transmission line 110, but it will be seen that for frequencies in the neighborhood of the frequency shown in Fig. 28A, which may be regarded as the resonant transmission frequency of the apparatus, the standing wave ratio will be less than if the stub 111 were used alone without any transformer. This may be seen by imagining the family of circles of an admittance diagram to be drawn about the point $Y_0$ in Figs. 28B and 28C, which will show that the points $Y_3$ and $Y_5$ will lie on circles inside, by a substantial amount, of the circles on which points such as $Y_2$ and $Y_4$ lie. This situation will be true for the entire included range of frequency as well as for some frequencies outside the range included between the frequency corresponding to the diagram 28B and the frequency corresponding to the diagram 28C.

Another example of an unsymmetrical transformer arrangement producing some compensation of the frequency-sensitivity of a stub support, although not as effective compensation as in the case of the symmetrical transformer arrangements herein described, is shown in Fig. 29. This arrangement is more closely related to the principal forms of the present invention than that just described because the arrangement of Fig. 29 can be constructed so as to provide more than one resonant frequency of transmission—in this case two such frequencies. The behavior of the device is illustrated in Fig. 30. Fig. 29 shows a transmission line 115 having a right-angle bend supported by a stub line 116. As previously pointed out in connection with Fig. 15, such a right-angle stub-supported corner presents a mismatch which, when referred to the right-angle junction, is composed almost entirely of a component along the real axis (referring to the change in admittance from the characteristic admittance of the transmission line). Such mismatch may be compensated by a quarter-wave length matching transformer adapted to cancel out the reflections occurring at the junction. Such a matching transformer might be provided by mounting a sleeve on the extremity of the conductor 117 where it joins the conductor 118, after the manner of the sleeve 65 of Fig. 15, or it might be provided by a quarter-wave length "undercut" transformer which begins a quarter-wave length away from the junction. I have found that both of the arrangements just mentioned will result in some decrease of the frequency-sensitivity normally to be expected from the stub 116. I have further found that it is somewhat preferable to employ an "undercut" transformer having a length either more or less than a quarter-wave length, which requires a readjustment of the spacing between the end of the transformer and the junction, as can readily be ascertained from circle diagrams. Specifically, in order to provide conveniently for a broad-band transmission characteristic exhibiting two resonant frequencies of transmission, I prefer the arrangement shown in Fig. 29 in which the conductor 17 is "undercut" as at 119 for a length of somewhat more than a quarter-wave length at midband frequency (for example, about 0.3 wave length) and located with its upper end slightly less than a quarter-wave length at midband frequency (about 0.22 wave length, for example) from the center of the right angle junction. Incidentally, it seems to be impossible, or at least impractical, to provide band-broadening with a matching transformer associated with the conductor 118, the stub arrangement in Fig. 29 being unsymmetrical.

The mode of operation of the arrangement of

Fig. 29 is not, as previously pointed out, capable of producing the extremely wide-band characteristics of the transformer-compensated devices herein described having symmetrical transformer arrangements designed according to the principles, since the arrangement of Fig. 29 provides for only two resonant frequencies of transmission while other devices herein described have three such frequencies. If the two resonant frequencies of the device of Fig. 29 are placed as far apart as the upper and lower resonant frequency of the device of Fig. 1 or that of Fig. 15, the midband transmission will be relatively less complete for the former device. If the device of Fig. 29 is designed for a slightly different matching transformer, the midband transmission may be improved, but the bandwidth will be reduced.

The behavior of the device of Fig. 29 is illustrated in Fig. 30, which is an impedance diagram on which $Z_0$ is the characteristic impedance of the line 115. Looking into the right angle bend from below the impedance measured at various frequencies in the absence of the transformer and extrapolated to the junction according to laboratory measurments, is represented by the line LH, the lower frequencies being represented in the L direction and the higher frequencies in the H direction. The line LH is not only inclined to the vertical (which is interesting, but does not require a change of the design approach) but also crosses the real axis at a point to the left of $Z_0$ (a fact of which use is made in this form of the invention). The effect of the portion of line between the undercut portion 110 and the right angle corner is to transform the line LH into the arc L'H', the lower frequencies being in the L' direction and the higher frequencies being in the H' direction. A transformer is then provided of characteristic impedance $Z_1$ such that a circle of the $Z_1$ family drawn through $Z_0$ intersects the line L'H' in two points $\lambda_1$ and $\lambda_2$ so related that the change in wave length between $\lambda_1$ and $\lambda_2$ provides for the necessary difference in electrical length between the arcs $\lambda_1 Z_0$ and $\lambda_2 Z_0$. This relation will hold reasonably well over a range of possible values of $Z_1$, as may be seen from the diagram, since as $Z_1$ is increased, both the wave length difference and the difference in electrical length of the arcs will increase. If $Z_1$ is chosen so that $\lambda_1$ and $\lambda_2$ are close together, the midband transmission will be good but the bandwidth will be less than if $\lambda_1$ and $\lambda_2$ were more greatly separated, the midband transmission in the latter case being relatively less. It will be seen that a similar arrangement could be provided with a transformer having a characteristic impedance less than $Z_0$ located closer to the right angle corner, providing transformation directly from the line LH to points near $Z_0$, two points on the line LH again transforming exactly to or very nearly to $Z_0$.

Although the foregoing description and explanation shows that a considerable variety of arrangements for reducing the frequency-sensitivity of resonant or anti-resonant elements associated with transmission lines are possible in accordance with the present invention, it should not be inferred that just any association of a matching transformer with a resonant element will reduce the frequency-sensitivity as desired. For instance, if in Fig. 1 an "undercut" half-wave length transformer, centered of the junction of the stub 8 were provided instead of the sleeve transformer 13, the frequency-sensitivity would be increased instead of decreased. It is generally true that for each of the illustrations herein described a converse arrangement exists which will increase instead of decrease the frequency-sensitivity and one must carefully observe the principles of the present invention as herein explained in order to select an arrangement adapted to reduce the frequency-sensitivity caused by the introduction of the resonant or anti-resonant element.

Because the symmetrical arrangements are no more difficult to construct than an unsymmetrical arrangement such as that shown in Fig. 28, and because the relatively symmetrical arrangements provide a transmission range of frequencies containing more than one resonant frequency, and generally as many as three such frequencies, the symmetrical arrangements are to be preferred. As previously mentioned, transmission characteristics which are extremely broad with respect to frequency can be obtained by the symmetrical transformer arrangements, and such characteristics are quite beyond the reach of a completely unsymmetrical arrangement such as that shown in Fig. 28, and in general are also distinctly superior to the result that can be obtained with a partly unsymmetrical arrangement such as could be obtained with a one-quarter-wave matching transformer on one side of a supporting stub and a three-quarter-wave matching transformer on the other side, or a corresponding arrangement of a double-stub type of transformer.

I am aware that the application of the conventional transmission line concepts to transmission lines having cross-sectional dimensions approaching substantial fractions (such as one-eighth or more) of a wave length and to hollow pipe wave guides is to be made with certain reservations and generally with great caution. In the above-described cases and in others similar to them these cautions and reservations introduce no appreciable error. The so-called "end effects" referred to in connection with Figs. 7, 8 and 9 may be regarded as a departure from "standard" transmission line behavior, for instance, and it will be noted from the discussion of these figures that the modifications thereby introduced do not affect the main principles of the invention and introduce only readily ascertainable adjustments that can be taken into account as herein explained. A similar situation exists with respect to hollow pipe wave guides.

Although the term "wave guide" properly used includes transmission lines, there has been some confusion in the use of this term by some workers in the art. In the appended claims, therefore, the term "linear transmission means" has been used to indicate the class of transmission means including hollow conducting pipes and two-conductor transmission lines of various types, such as the coaxial conductor line.

The terms "resonant element" and "resonant structure" have been used in a broad sense to include structures having anti-resonant frequencies in the frequency range in question as well as structures having resonant (i. e. "series resonant") frequencies in the range in question, this being a not uncommon use of the adjective "resonant." These terms therefore define structures having a critical frequency in the frequency range in which it is desired to operate the transmission line with which the structure is associated, the word "critical" here being used in its ordinary sense with respect to reactance and susceptance functions, including both poles and zeros of such functions. In claims referring to shunt structures in a transmission line, the term "resonant" means "parallel resonant" or "antiresonant," again in accordance with common usage. The term "resonant" is used to describe structures in which some resonance exists within the frequency range in question, although appreciable energy loss may or may not take place in such structure.

The term "resonant frequencies of transmission" used in some of the claims is used in the sense in which such term is used in filter terminology. This particular term is believed to be appropriate in the manner used herein in spite of the great difficulties of drawing complete analogies between lumped reactance networks and structures of the type here involved.

The term "transformer" as here used both in the specification and the claims, in accord with common usage in microwave theory and technology, refers particularly to impedance-transformation devices such as portions of transmission means having altered characteristic admittance and associations of reactive elements with transmission lines such as double-stub arrangements, these types of impedance-transforming devices being almost the only practical forms of such devices for apparatus in which the wave length is of the order of magnitude of one or more dimensions of the apparatus.

The effect of energy losses in the apparatus in question has been left out of account in the foregoing description because this effect is relatively very small, since highly conductive materials are normally used in such apparatus. The general manner in which such factors may be taken into account is understood in the art.

What I desire to claim and obtain by Letters Patent is:

1. Apparatus including a resonant element coupled to a coaxial line and having reduced frequency sensitivity, which apparatus includes a resonant transformer formed, at least in part, of a portion of said coaxial line located nonsymmetrically in the proximity of said resonant element.

2. Apparatus as in claim 1, wherein said resonant element comprises a supporting stub for said coaxial line.

3. In combination with a coaxial line having a resonant element coupled thereto, means for reducing frequency sensitivity comprising, a resonant transformer disposed within said line nonsymmetrically with respect to said resonant element and having a frequency characteristic adapted to counteract that of said resonant element.

4. Apparatus as in claim 3 wherein said transformer includes a section of said coaxial line having dimensions different from the remainder thereof.

5. Apparatus as in claim 3 wherein said transformer includes a section of the inner conductor of said coaxial line, said inner conductor section being of a diameter less than the remainder of said inner conductor.

6. A coaxial transmission line having an inner conductor and an outer conductor, a quarter-wave coaxial stub connecting with said line, said stub having an inner conductor supporting the inner conductor of said coaxial line, means for counteracting the frequency sensitivity of said quarter-wave stub comprising a resonant transformer being formed of a section of said coaxial line wholly to one side of said stub, said line section having a characteristic impedance greater than the remainder of said coaxial line.

7. Apparatus as in claim 6 wherein the inner conductor of said section of coaxial line is of a diameter less than the diameter of the inner conductor of the remainder of said line.

8. Apparatus including a resonant element associated with a linear electrical transmission means and having reduced frequency sensitivity which apparatus includes, in association with said resonant element, a resonant transformer formed of a portion of said transmission means and comprising a loading reactance having a finite non-zero value of reactance over the frequency transmission range, said transformer being disposed along said transmission means wholly to one side of the location at which said resonant element is associated with said linear transmission means.

9. Apparatus as in claim 8 wherein said resonant transformer comprises a section of coaxial line having a characteristic impedance greater than the remainder of said linear electrical transmission means.

10. A coaxial transmission line having an inner conductor and an outer conductor, a quarter wave coaxial stub connecting with said line, said stub having an inner conductor joined with and supporting the inner conductor of said coaxial line, a section of the inner conductor of said transmission line extending from the junction of said line and stub inner conductors in a first direction away from said coaxial stub having a diameter less than the diameter of the inner conductor of said line extending from said junction in the opposite direction, said reduced diameter section forming with its associated outer conductor section a resonant transformer for counteracting the frequency sensitivity of said quarter wave stub.

11. Apparatus as in claim 10 wherein the axial length of said reduced diameter section of inner conductor is substantially one-half wave length measured at the frequency at which said stub is anti-resonant.

12. A coaxial transmission line having first and second sections each formed of substantially equal diameter inner and outer conductors joined at right angles, a quarter wave coaxial stub forming an extension of said first line section from the junction of said first and second line sections, and means in said second line section for counteracting the frequency sensitivity of said quarter wave stub.

13. Apparatus as in claim 12 wherein said last-mentioned means comprises a section of the inner conductor of said second section of reduced diameter separated from the junction of the inner conductors of said first and second line sections.

ROBERT V. POUND.

REFERENCES CITED

The following references are of record in the file of this patent:

UNITED STATES PATENTS

| Number | Name | Date |
| --- | --- | --- |
| 2,201,326 | Trevor | May 21, 1940 |
| 2,284,529 | Mason | May 26, 1942 |
| 2,432,093 | Fox | Dec. 9, 1947 |